(12) United States Patent
Silverbrook et al.

(10) Patent No.: US 6,454,482 B1
(45) Date of Patent: *Sep. 24, 2002

(54) UNIVERSAL PEN

(75) Inventors: Kia Silverbrook, Balmain (AU); Paul Lapstun, Rodd Point (AU); Tobin Allen King, Cremorne (AU)

(73) Assignee: Silverbrook Research Pty Ltd, Balmain (AU)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/693,388

(22) Filed: Oct. 20, 2000

(30) Foreign Application Priority Data

Oct. 25, 1999 (AU) ................................................ PQ3632
Dec. 1, 1999 (AU) ................................................ PQ4392

(51) Int. Cl.[7] .............................................. B43K 29/00
(52) U.S. Cl. ................ 401/195; 346/140.1; 364/140.01
(58) Field of Search ................ 401/195, 52; 346/140.1; 364/140.01

(56) References Cited

U.S. PATENT DOCUMENTS

| 4,748,460 A | | 5/1988 | Piatt et al. |
| 4,758,849 A | | 7/1988 | Piatt et al. |
| 5,501,535 A | | 3/1996 | Hastings et al. |
| 5,939,702 A | * | 8/1999 | Knighton et al. ....... 401/195 X |

* cited by examiner

Primary Examiner—David J. Walczak
Assistant Examiner—Kathleen J. Prunner

(57) ABSTRACT

A pen includes an electronically controllable marking device, for marking a visible path onto a surface. The device includes a memory for storing sets of values of attributes of the path. The pen also has a selection mode, in which the pen is caused to cycle though the stored sets of attribute values by the user sequentially marking separate paths, with a different set of attribute values applied each path compared to the preceding path.

16 Claims, 35 Drawing Sheets

UNIVERSAL PEN

FIELD OF INVENTION

The present invention relates to implements for placing markings, such as writing and drawings, on substrates, and more particularly to devices capable of placing markings with selectable characteristics, such as color, line width, and style. Marking includes the deposition of material, such as ink or toner, or the modification of the substrate itself, such as by thermal or electrostatic means.

CO-PENDING APPLICATIONS

Various methods, systems and apparatus relating to the present invention are disclosed in the following co-pending applications filed by the applicant or assignee of the present invention simultaneously with the present invention:

Ser. No. 09/693,415 (NPA011US), Ser. No. 09/693,219 (NPA031US),

Ser. No. 09/693,280 (NPA040US), Ser. No. 09/693,515 (NPA046US),

Ser. No. 09/693,705 (NPA053US), Ser. No. 09/693,647 (NPA059US),

Ser. No. 09/693,690 (NPA064US), Ser. No. 09/693,593 (NPB006US),

Ser. No. 09/693,216 (NPS004US), Ser. No. 09/693,341 (NPS008US),

Ser. No. 09/696,473 (NPS013US) Ser. No. 09/696,514 (NPS024US),

Ser. No. 09/693,301 (NPPC1), Ser. No. 09/693,388 (UP01US),

Ser. No. 09/693,704 (UP02US), Ser. No. 09/693,510 (UP03US),

Ser. No. 09/09/693,336 (UP04US), Ser. No. 09/693,335 (UP05US)

The disclosures of these co-pending applications are incorporated herein by cross-reference.

Various methods, systems and apparatus relating to the present invention are disclosed in the following co-pending applications filed by the applicant or assignee of the present invention on Sep. 15, 2000:

Ser. No. 09/663,579 (NPA024US), Ser. No. 09/669,599 (NPA025US), Ser. No. 09/663,701 (NPA047US), Ser. No. 09/663,640 (NPA049US),

The disclosures of these co-pending applications are incorporated herein by reference.

Various methods, systems and apparatus relating to the present invention are disclosed in the following co-pending applications filed by the applicant or assignee of the present invention on Jun. 30, 2000:

Ser. No. 09/609,139 (NPA014US), Ser. No. 09/608,970 (NPA015US), Ser. No. 09/609,039 (NPA022US),

Ser. No. 09/607,852 (NPA026US), Ser. No. 09/607,656 (NPA038US), Ser. No. 09/609,132 (NPA041US),

Ser. No. 09/609,303 (NPA050US), Ser. No. 09/610,095 (NPA051US), Ser. No. 09/609,596 (NPA052US),

Ser. No. 09/607,843 (NPA063US), Ser. No. 09/607,605 (NPA065US), Ser. No. 09/608,178 (NPA067US),

Ser. No. 09/609,553 (NPA068US), Ser. No. 09/609,233 (NPA069US), Ser. No. 09/609,149 (NPA071US),

Ser. No. 09/608,022 (NPA072US), Ser. No. 09/609,232 (NPB003US), Ser. No. 09/607,844 (NPB004US),

Ser. No. 09/607,657 (NPB005US), Ser. No. 09/608,920 (NPP019US), Ser. No. 09/607,985 (PEC04US),

Ser. No. 09/607,990 (PEC05US), Ser. No. 09/607,196 (PEC06US), Ser. No. 09/606,999 (PEC07US)

The disclosures of these co-pending applications are incorporated herein by reference.

Various methods, systems and apparatus relating to the present invention are disclosed in the following co-pending applications filed by the applicant or assignee of the present invention on May 23, 2000:

Ser. No. 09/575,197 (NPA001US), Ser. No. 09/575,195 (NPA002US), Ser. No. 09/575,159 (NPA004US),

Ser. No. 09/575,132 (NPA005US), Ser. No. 09/575,123 (NPA006US), Ser. No. 09/575,148 (NPA007US),

Ser. No. 09/575,130 (NPA008US), Ser. No. 09/575,165 (NPA009US), Ser. No. 09/575,153 (NPA010US),

Ser. No. 09/575,118 (NPA012US), Ser. No. 09/575,131 (NPA016US), Ser. No. 09/575,116 (NPA017US)

Ser. No. 09/575,144 (NPA018US), Ser. No. 09/575,139 (NPA019US), Ser. No. 09/575,186 (NPA020US),

Ser. No. 09/575,185 (NPA021US), Ser. No. 09/575,191 (NPA030US), Ser. No. 09/575,145 (NPA035US),

Ser. No. 09/575,192 (NPA048US), Ser. No. 09/575,181 (NPA075US), Ser. No. 09/575,193 (NPB001US),

Ser. No. 09/575,156 (NPB002US), Ser. No. 09/575,183 (NPK002US), Ser. No. 09/575,160 (NPK003US),

Ser. No. 09/575,150 (NPK004US), Ser. No. 09/575,169 (NPK005US), Ser. No. 09/575,184 (NPM001US),

Ser. No. 09/575,128 (NPM002US), Ser. No. 09/575,180 (NPM003US), Ser. No. 09/575,149 (NPM004US),

Ser. No. 09/575,179 (NPN001US), Ser. No. 09/575,133 (NPP005US), Ser. No. 09/575,143 (NPP006US),

Ser. No. 09/575,187 (NPP001US), Ser. No. 09/575,155 (NPP003US), Ser. No. 09/575,196 (NPP007US),

Ser. No. 09/575,198 (NPP008US), Ser. No. 09/575,178 (NPP016US), Ser. No. 09/575,164 (NPP017US),

Ser. No. 09/575,146 (NPP018US), Ser. No. 09/575,174 (NPS001US), Ser. No. 09/575,163 (NPS003US),

Ser. No. 09/575,168 (NPS020US), Ser. No. 09/575,154 (NPT001US), Ser. No. 09/575,129 (NPT002US),

Ser. No. 09/575,124 (NPT003US), Ser. No. 09/575,188 (NPT004US), Ser. No. 09/575,189 (NPX001US),

Ser. No. 09/575,162 (NPX003US), Ser. No. 09/575,172 (NPX008US), Ser. No. 09/575,170 (NPX011US),

Ser. No. 09/575,171 (NPX014US), Ser. No. 09/575,161 (NPX016US), Ser. No. 09/575,141 (IJ52US),

Ser. No. 09/575,125 (IJM52US), Ser. No. 09/575,142 (MJ10US), Ser. No. 09/575,140 (MJ11US),

Ser. No. 9/575,190 (MJ12US), Ser. No. 09/575,138 (MJ13US), Ser. No. 09/575,126 (MJ14US),

Ser. No. 09/575,127 (MJ15US), Ser. No. 09/575,158 (MJ34US), Ser. No. 09/575,117 (MJ47US),

Ser. No. 09/575,147 (MJ58US), Ser. No. 09/575,152 (MJ62US), Ser. No. 09/575,176 (MJ63US),

Ser. No. 09/575,115 (PAK04US), Ser. No. 09/575,114 (PAK05US), Ser. No. 09/575,113 (PAK06US),

Ser. No. 09/575,112 (PAK07US), Ser. No. 09/575,111 (PAK08US), Ser. No. 09/575,108 (PEC01US),

Ser. No. 09/575,109 (PEC02US), Ser. No. 09/575,110 (PEC03US)

The disclosures of these co-pending applications are incorporated herein by cross-reference.

BACKGROUND

Current drawing and writing implements such as pens and pencils are relatively static devices in relation to the characteristics of the marking that they produce. A pencil, fountain or ball type pen generally has a single marking point which deposits a single color of lead or ink. The marking point of a pen cannot be modified other than by replacement and any modification of the characteristics of markings made rely on the user changing the orientation of the implement, the direction of movement and the force applied to the substrate. Whilst some ball type pens are available with multiple separate cartridges, these merely provide the user with the ability to select a particular color. Because each color is provided by a separate cartridge, there is a limit on the number of colors which may be practically provided.

SUMMARY OF INVENTION

In an attempt to provide a writing or marking implement with increased utility, the present invention, in one broad form, provides a pen or a cartridge for a pen including an inkjet type printhead as an alternative to a conventional nib or point of a pen or pencil. The provision of an inkjet type printhead enables more variation of and easier control over the characteristics of the markings made as compared to conventional pens and pencils.

The invention also provides, in one broad form, a pen including a marking device and operative to mark a visible path onto a surface, the marking device electronically controllable to change at least one attribute of the path, the pen including a user interface whereby a user may modify the at least one attribute.

The marking device may be integral with the pen or may be part of a user replaceable cartridge.

Accordingly, in one broad form, the invention also provides a cartridge for a pen, the cartridge including a marking device and operative to mark a visible path onto a surface, the marking device electronically controllable to change at least one attribute of the path.

The pen or the cartridge may include a non marking stylus nib. The stylus nib is preferably movable along a first axis relative to the cartridge body or pen. Alternatively the stylus nib may be fixed. In the preferred form the stylus and marking device are both part of a user replaceable cartridge but the stylus nib may be part of the pen and the marking device part of a disposable cartridge.

A position sensor which senses the relative position of the stylus nib, or a force sensor which senses the compressive force applied to the stylus nib, or both, may be provided. The information sensed may be used merely to turn the marking device!on or off or it may also be used to control an attribute of the path deposited.

An on/off switch may be turned to an "on" state upon sensing of more than a predetermined amount of movement of the stylus nib or application of more than a predetermined compressive force to the stylus nib.

The marking device preferably includes a capper device movable between an open position, in which the printhead may deposit ink on the surface, and a closed. position in which the capper blocks the printhead from depositing ink.

In the preferred form the capper device rotates about an axis between the open and closed positions. Preferably this movement is achieved by movement of the stylus nib.

In a preferred embodiment there is a stylus nib movable along a first axis which includes a slot or groove extending at other than 0° or 90° to the first axis. A capper device is mounted in front of the marking device and is rotatable about a second axis parallel to the first axis between an open and closed position. The capper device includes an arm engaging the slot or groove, whereby movement of the stylus nib along the first axis moves the capper device between the open and closed positions.

The cartridge or pen may include a power source for at least the marking device and preferably for the user interface. The power source may be a disposable battery or a rechargeable battery.

Where a cartridge is provided, the cartridge preferably includes an electrical input for receiving at least one control signal for changing the at least one attribute from the pen.

The marking device may act onto the surface or a transfer device may be provided onto which the marking device acts.

Where a cartridge is provided, the cartridge may include non volatile memory which stores at least data relating to the modifiable attribute or attributes.

The marking device is preferably an ink ejection type printhead but other marking devices may be used.

The invention in a further embodiment provides a pen including a marking device and operative to mark a visible path onto a surface, the marking device electronically controllable to change at least one attribute of the path, the pen including a user interface whereby a user may modify the at least one attribute, and at least one sensing device for sensing images or colors or both.

At least one attribute may be modified, based on the sensed image or color.

The pen preferably includes a memory for storing at least one user defined set of attributes and a user defined set optionally includes attributes derived from an image or color sensed by the sensing device.

One of the sensor device(s) may be capable of sensing images including coded data relating to attributes.

The sensing device may be located adjacent the marking device or be located at one end of the pen with the marking device located at the other end of the pen.

The sensing device is preferably operable by pushing the device against a surface.

The user interface may include at least one slider or at least one control button or at least one slider and at least one control button.

The user interface may include a display for displaying information relating to the at least one attribute.

The user interface is preferably operable to cycle through the stored sets of at least one attribute.

The invention also provides a pen including a marking device and operative to mark a visible path onto a surface, the marking device electronically controllable to change at least one attribute of the path, the pen including a user interface whereby a user may modify the at least one attribute and at least one sensor device capable of sensing images including coded data.

The pen preferably includes a decoder to decode the coded data and to change at least one attribute in response to the decoded data.

The pen may include a receiver for receiving commands from an external control source, at least one attribute being changed in response to said received commands.

The pen preferably includes a memory for storing different sets of attribute values. The memory may store at least one user defined set of the at least one attribute.

The pen preferably includes a transmitter for transmitting sensed image data, coded data or decoded data to an external control source.

The pen preferably transmits sensed image data, coded data or decoded data to an external control source together with the value or values of the at least one attribute of the path at the location of the sensed image.

The pen may include a position sensing device or a motion sensing device or both and at least one attribute is dependant on the relative position of the pen, the relative speed of the pen or both.

The position or speed of the pen may be derived from the sensed position of the images or it may be derived from the data encoded in the sensed images.

The invention also provides, in one broad form, an ink ejection type printhead having a plurality of ink ejection devices and a central axis, the ink ejection devices arranged in a series of groups, each of the groups generally extending along non parallel lines.

Adjacent ink ejection devices of each group may be located on alternate sides of a radial line or on a radial line.

A set of the devices may be connected to a common supply of ink. Preferably each set includes devices of more than one group and more preferably each set has a different ink supply to the other sets. The devices of a group are preferably part of the same set and adjacent groups belong to different sets.

The groups of different sets are preferably arranged in a repeating pattern.

Preferably there are four sets and twelve groups.

Preferably each group of devices is supplied with ink from a common gallery, all of the galleries being at a first level in the printhead, galleries for a set of devices being interconnected in part by at least one interconnecting passageway at a second level, the interconnecting passageways of each set passing beneath galleries of at least one other set.

The printhead preferably includes a first layer of solid material, an ink ejection device layer above the first layer and a second layer of solid material below the first layer.

The galleries are preferably slots extending through the thickness of the first layer and preferably the interconnecting passageways are grooves in the lower surface of the second layer which extend only partway through the thickness of the second layer.

Preferably the second layer includes linking passageways linking the galleries with the interconnecting passageways, the linking passageways extending through the thickness of the second layer.

The first, second and an ink ejection device layers are discrete layers or part of an integral device.

BRIEF DESCRIPTION OF DRAWINGS

FIG. 28 shows a perspective view of a pen according to a further embodiment of the invention with a cap on.

DETAILED DESCRIPTION OF PREFERRED AND OTHER EMBODIMENTS

Figure 1:
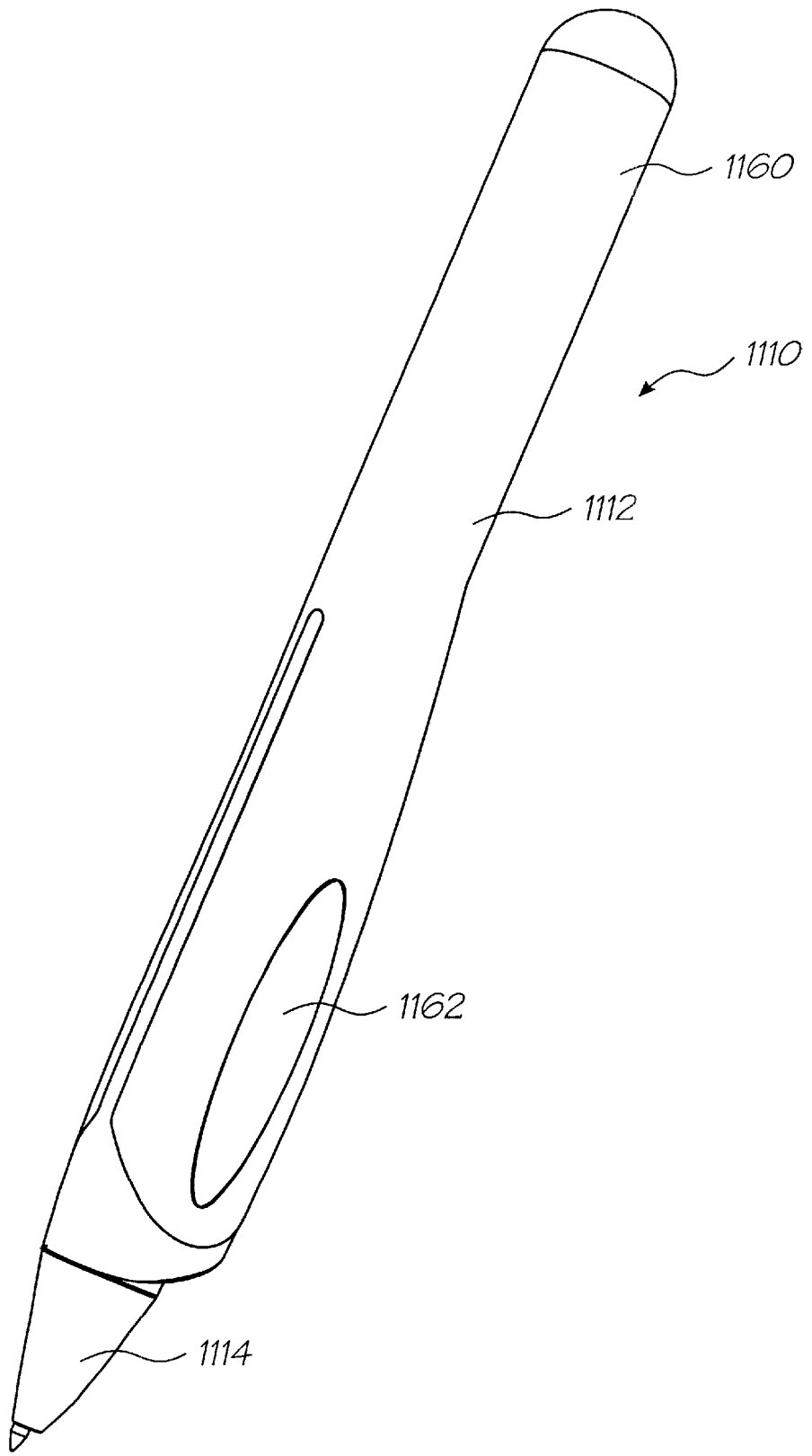
FIG. 1 shows a perspective view of a pen according to a first embodiment of the invention.
Figure 2:
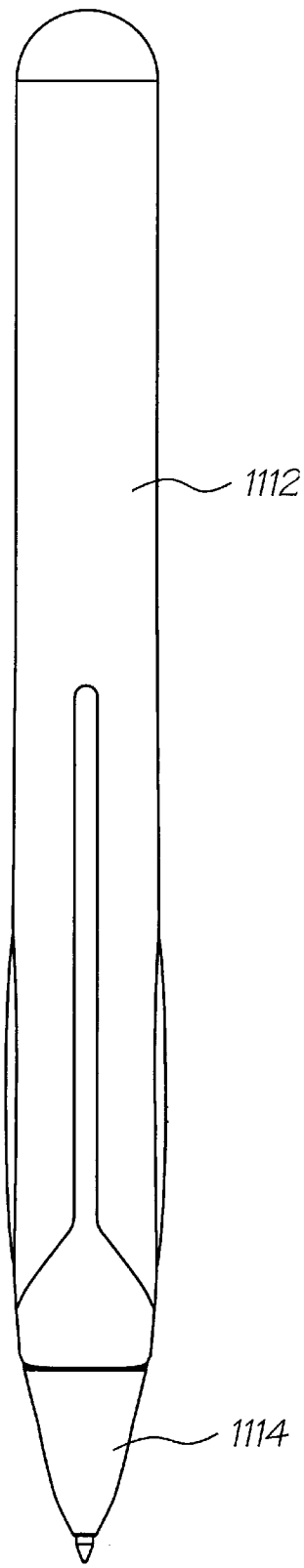
FIG. 2 shows a plan view of the pen shown in FIG. 1.

Note: Memjet™ is a trademark of Silverbrook Research Pty Ltd, Australia.

BASIC PEN & CARTRIDGE CONSTRUCTION

FIGS. 1 to 6 show a pen 1110 according to a first embodiment of the invention. The pen has a generally tubular pen body 1112 in which is located a replaceable cartridge assembly 1114. The cartridge 1114 includes an ink supply 1116, stylus nib 1118 and printhead 1120 and is designed to be discarded when the ink supply is expended or the stylus or printhead are damaged, with a new cartridge being inserted into the pen body. However the pen may be manufactured as a throw-away item with the cartridge and pen body integral or not end user separable.

The ink supply 1116 comprises an elongate hollow tube 1122 which is closed at one end by a first end cap 1124 and at the other end by a second end cap 1126. The tube 1122 is preferably made of a thermoplastics material but may be made of other materials. When made of a plastics material the tube is preferably extruded so as to have a constant cross sectional profile. However the tube may be injection molded. If made of metal, the tube may be also extruded. The tube 1122 has a number of ribs 1128 which divide the interior of the tube into four separate chambers 1130, 1132, 1134 & 1136. These ribs also provide rigidity. The chambers are filled with ink. At its simplest the chambers all have the same colored ink. Alternatively there may be different colored inks in each chamber. With four colors and a suitable printhead it is possible to produce almost any desired color using a combination of Cyan, Magenta, Yellow and BlacK (CMYK) color inks.

The chamber 1130 occupies approximately half of the tube volume whilst the three remaining chambers each occupy one sixth of the tube volume. In a CMYK color printing device black is normally printed more than color and so black ink would be stored in chamber 1130 with the three other colors stored in chambers 1132,1134 & 1136. It will be appreciated that the number and relative volumes of the chambers may be varied as desired. Some current desktop ink jet printers utilize six different colored inks in addition to black and, if desired, the tube may be divided into seven chambers. The colored ink chambers need not all have the same volume and the black ink chamber (if black ink is used) need not have half of the available volume. As color becomes more accessible, the proportion of printing using black ink may decrease and so the ratio of black ink to colored ink may change. Similarly, whilst color inks are supplied in equal amount, there is no reason why, for instance, that a larger supply of magenta could not be provided.

The first end cap 1124 is shaped to substantially seal the ends of each of the chambers. The end cap 1124 includes small air inlets 1140 to allow air into the chambers as the ink is used. To prevent drying of the inks through evaporation (the inks used are usually water based) a movable seal, not shown, is provided between the ink and the end cap 1124. As ink is used, the seal moves along the respective chamber.

The second end cap 1126 is also shaped to substantially seal each of the chambers but is provided with ink galleries 1178 (see FIG. 15) which communicate the chambers with the printhead 1120, bonded to the free end of the cap 1126. The printhead is preferably an ink jet type printhead and more preferably a microelectromechanical system (MEMS) based inkjet. MEMS based inkjets expel ink using mechanical actuators rather than by heating of the ink, as currently used by most ink jet type printers currently available. As such MEMS based inkjets have a lower power consumption compared to such printers, which makes them attractive for use in portable devices where available power is limited. For a better understanding of MEMS ink jet devices and methods of fabrication, reference is made to our earlier U.S. application, Ser. No. 09/575,141, the contents of which are incorporated herein by reference.

The printhead is bonded to the end cap 1126 but mounted on a flexible printed circuit board (PCB) 1144 which includes control and power contacts 1146.

A stylus nib 1118 is mounted on the end cap 1126 so as to be capable of a small amount of axial movement. Axial movement of the stylus nib 1118 is controlled by integral arms 1148 which extend laterally and axially away from the inner end of the stylus to bear against a land 1184 (see FIG. 15). In use, pressing the stylus against a substrate causes the arms 1148 to bend and allows the stylus to retract. The stylus is preferably formed by injection molding of a thermoplastic material, most preferably Acetyl. This movement is typically a maximum of amount 0.5 mm and provides some feedback to the user. In addition the flexibility of the stylus nib accommodates a small amount of roughness in the substrate surface. If desired the stylus nib may be fixed with substantially no movement allowed.

The first end cap 1124 is shaped to receive a small button or cylinder type battery 1138. The battery may merely sit on the end of the end cap or it may be inserted sideways into a chamber in the end cap. Locating the battery in a chamber enables both terminals of a button or cylindrical type battery to be easily engaged by electrical contacts in the chamber. Merely sitting the battery on the end only allows easy engagement with one terminal. One or two wires or other electrical paths 1139 are provided which connect one or both terminals of the battery 1138 with the PCB 1144.

A nib cap 1152 extends over the end cap 1126, printhead 1120, PCB 1144 and stylus nib 1118 and an aperture 1154 is provided through which the free end 1156 of the stylus nib 1118 projects. The aperture 1154 is oval in shape and allows the printhead 1120 to expel ink though the aperture below the stylus nib.

The cartridge 1116 is positioned in the pen body 1112 and secured in place by one or more resilient snap action arms 1158 integrally formed on the nib cap 1152. Where the battery 1138 is securely mounted on the end cap with both terminals in electrical connection with the PCB 1144, the cartridge need not otherwise engage the pen body 1112. Where only one terminal is connected to the PCB, the pen body may be used to provide the path for the other terminal, via switches if desired, in which case the free end of the battery engages a terminal mounted in the closed end 1160 of the body 1112.

In a monochrome pen the minimum functionality required to control the printhead is an on/off switch and circuitry for controlling the ink jet actuators. The PCB or the printhead itself incorporate the control circuitry for the ink jet actuators. The on/off switch is preferably controlled so that ink is only ejected when the stylus nib is pressed on a substrate. Pressing the stylus against a substrate results in a compressive force in the stylus nib. In this embodiment this results in movement of the stylus and the on/off switch may be activated by the movement, by sensing the compressive force or by other means. Where the stylus is substantially fixed, movement of the stylus nib relative to the rest of the pen is not available.

The PCB and printhead circuitry may be permanently connected to the battery or the pen may be provided with a separate "master" on/off switch. Provision of a master on/off switch allows the user to use the pen in a non-marking mode, such as for use with a touch screen of a personal organizer type device. Other mechanisms may be used to ensure no printing of the pen, as will be explained later. Where there is no override type system, such that the pen is permanently "on", the printhead or PCB circuitry or both preferably include "sleep mode" type circuitry which turns off most of the electrical circuits to conserve battery power. Pressing the stylus nib results in "wake up" of the electrical systems and printing. Being a solid state device, the delay in commencing printing caused by changing from a sleep mode to an active mode will be so small as to be unnoticed by a user. If the pen includes a motion sensing device, such as an accelerometer, then this sensor can "wake up" the pen on sensing motion above a specified threshold.

Figure 3:
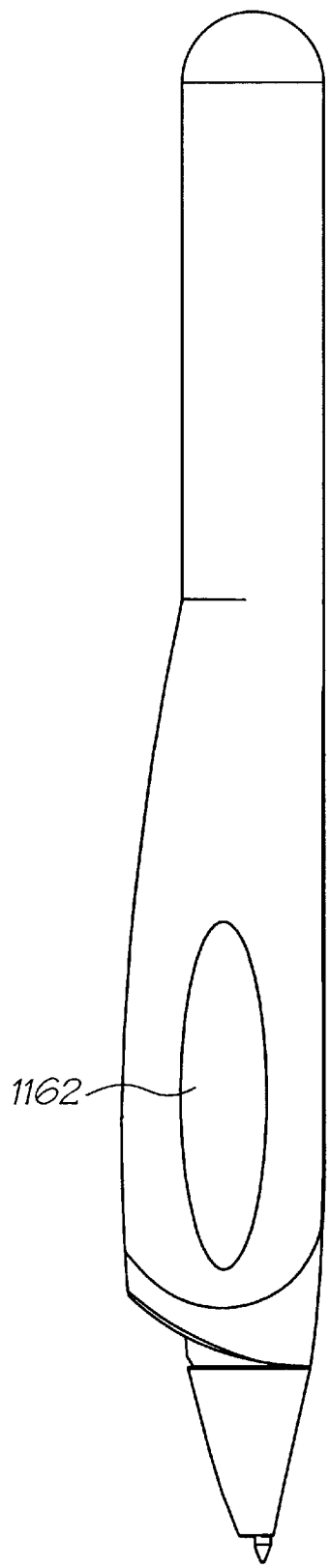
FIG. 3 shows a side view of the pen shown in FIG. 1.
Figure 4:
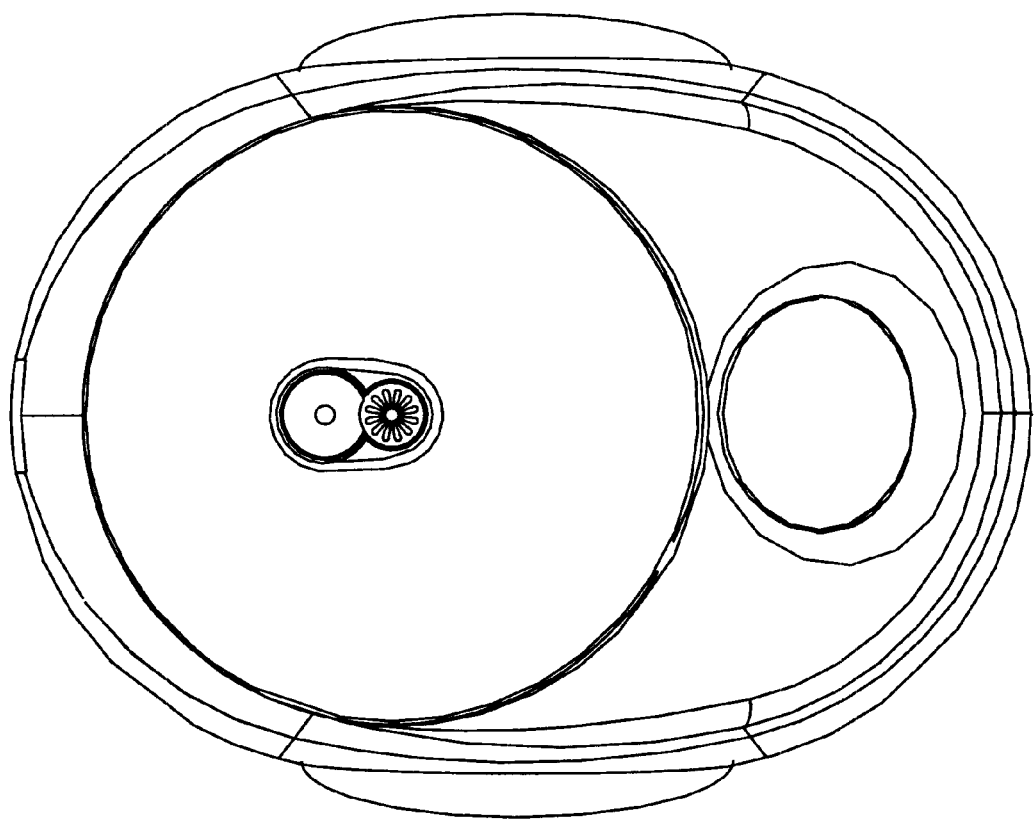
FIG. 4 shows an end view of the pen shown in FIG. 1.

As best seen in FIGS. 1 & 3 the pen body 1112 is not symmetrical but instead is provided with a finger grip 1162. This finger grip 1162 encourages the user to hold the pen in an orientation with the stylus nib 1118 above the printhead 1120. However, the orientation of the pen is not critical and the pen is configured so that the stylus nib will not obstruct the path of ink from the printhead to the paper at any orientation, as shown in FIG. 7.

Figure 7:
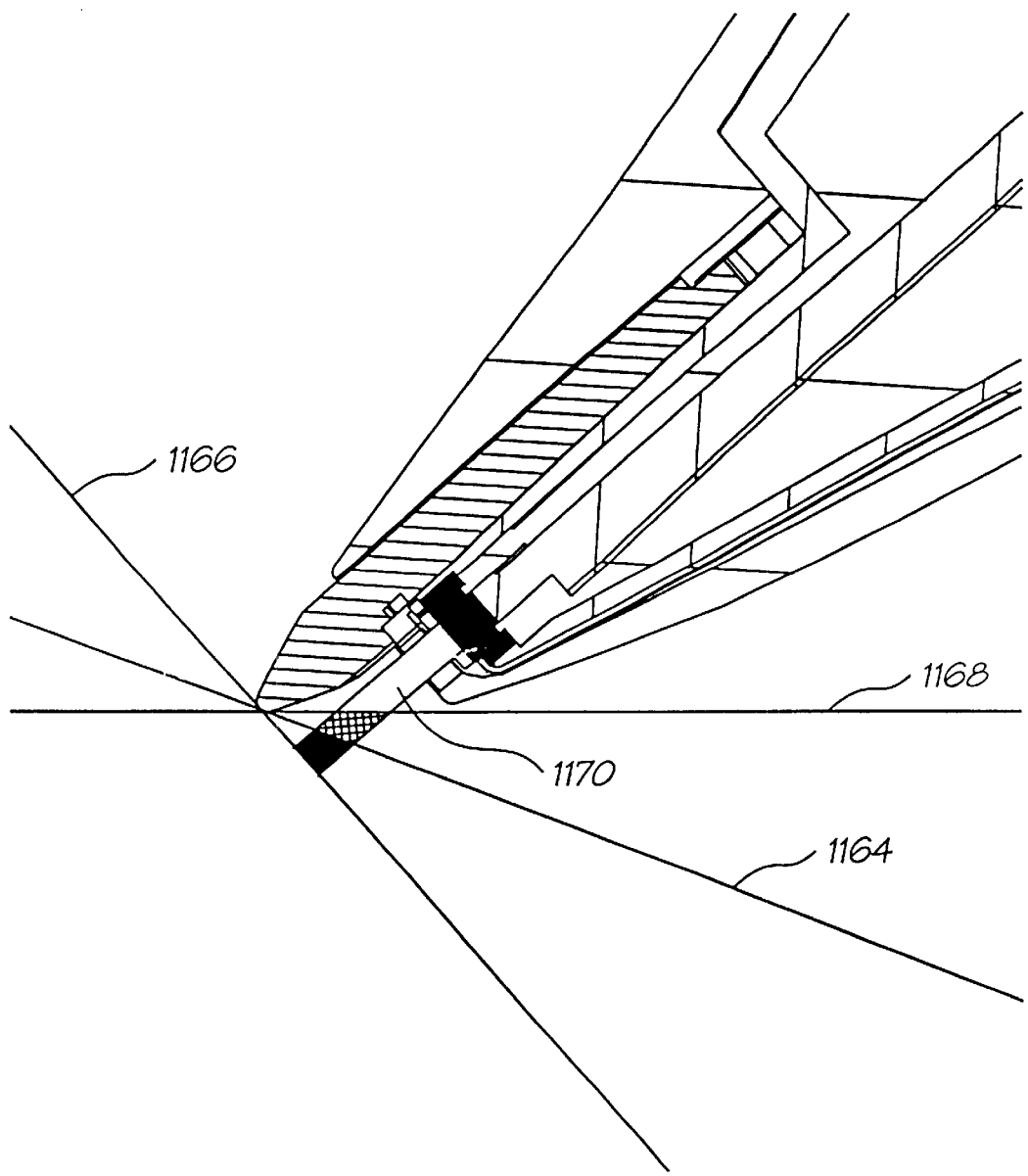
FIG. 7 shows a side view of the nib area of the pen of FIG. 1 with paper at various orientations.

FIG. 7 shows the stylus nib resting against paper at three different orientations, indicated by numbers 1164, 1166 & 1168. The path of ink from the printhead is indicated by line 1170. Paper sheet 1164 represents an orientation with the stylus nib above the printhead whilst paper sheet 1166 represents an orientation with the stylus nib below the printhead. Paper sheet 1168 represents an orientation with the stylus nib to the side of the printhead. As seen, the stylus nib does not obstruct the path of the ink to the paper at any orientation.

Figure 8:
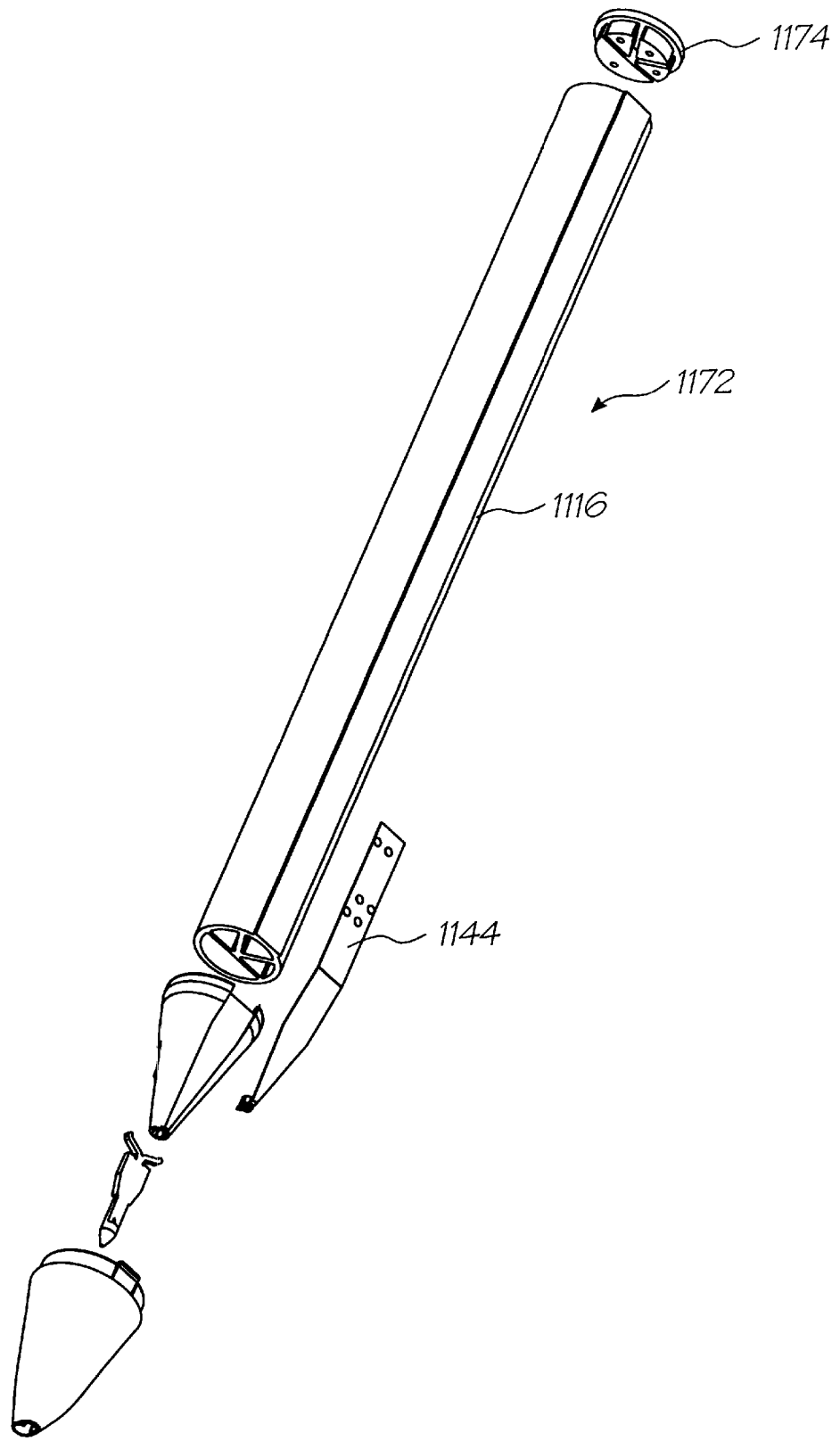
FIG. 8 shows an exploded perspective view of a cartridge for use in a pen according to a second embodiment of the invention.

FIG. 8 shows a cartridge 1172 similar to that of FIGS. 1 to 6 except that the cartridge does not include a battery. The cartridge is otherwise substantially identical to the cartridge of FIGS. 1 to 6 and so the same parts are identified with the same numbers. The main differences are that end cap 1174 is a simple plug and has no provision for receiving a battery. In addition there is no electrical connection or wires extending to the PCB 1144. The cartridge 1172 is intended for use in a pen body which includes a power source, either a battery or a wired connection. The body of the pen includes electrical terminals for contacting with the PCB 1144. The ink supply 1116 may be the same length as that of the self powered embodiment or it may be a different length. The battery in the pen may be disposable or a rechargeable type battery.

The cartridges preferably include identity information hard coded or stored in non-volatile memory which identifies one or more characteristics of the cartridge, such as whether the cartridge is a mono or color cartridge, the maximum width of line possible, etc. In addition the cartridges may include circuitry for monitoring ink levels in each chamber or for detecting when an ink has run out. This information may be made available to the pen via the contacts on the PCB 1144. Alternatively the pen controller may decrement values from a calculated, assumed or cartridge supplied initial ink volume as printing occurs. In one form the cartridge may store the initial ink volume in non-volatile memory and the pen may extract this information from the cartridge when the cartridge is installed. This enables the cartridge to be a relatively "dumb" device.

PEN WITH SENSOR

Figure 9:
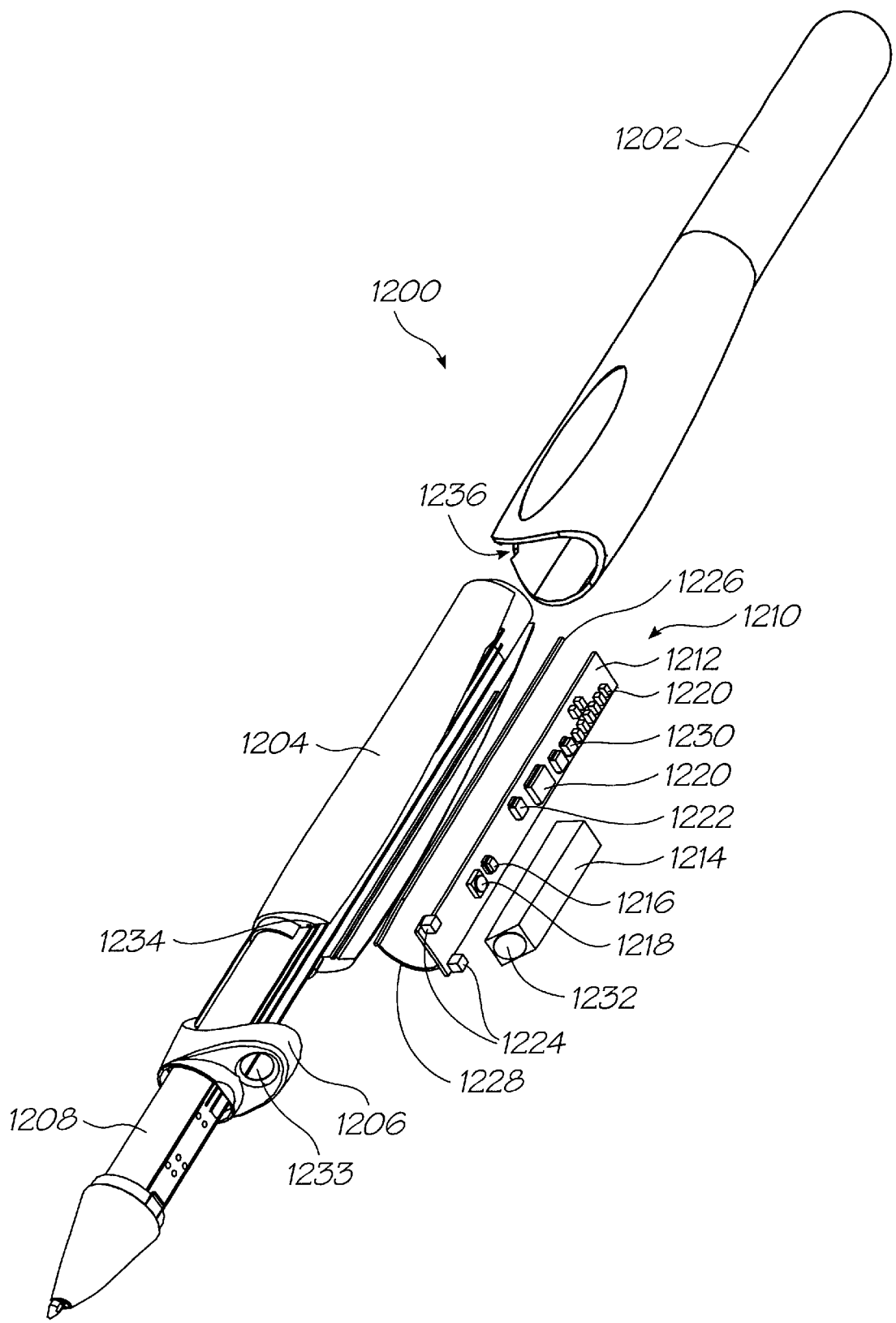
FIG. 9 shows an exploded perspective view of a pen according to a third embodiment of the invention.
Figure 10:
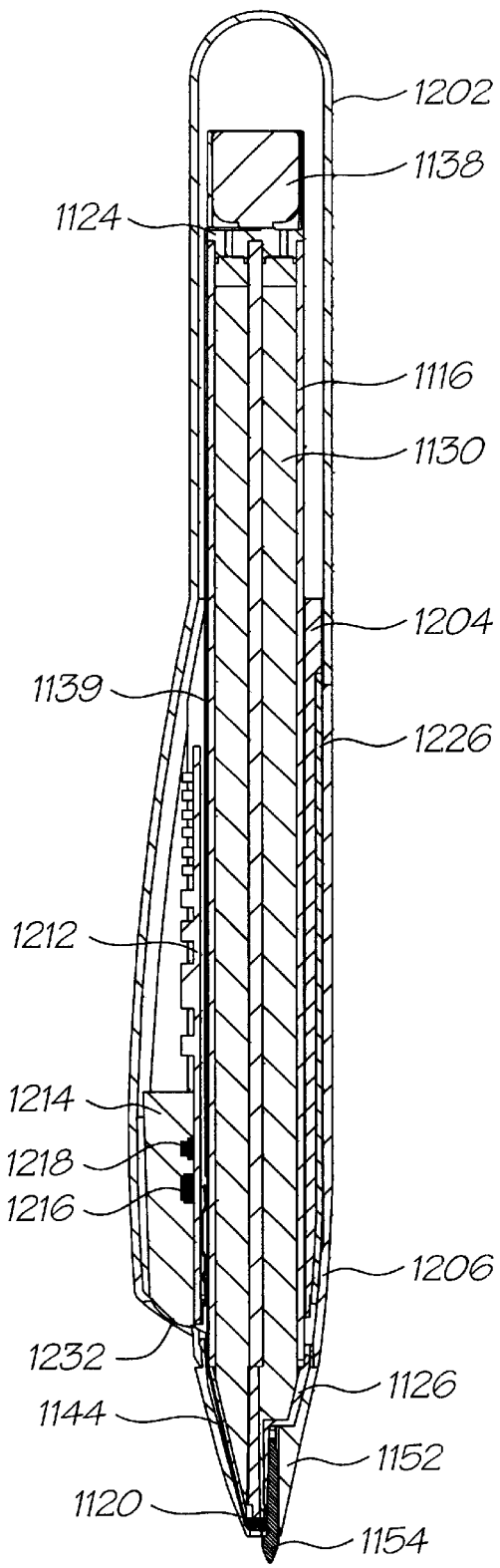
FIG. 10 shows an axial cross sectional view of the pen of FIG. 9.

A pen with a built-in optical sensing device is show in FIGS. 9 and 10. The pen 1200 has a body molding 1202, a chassis molding 1204 and a front molding 1206. The pen 1200 uses a cartridge 1208 the same as shown in FIGS. 1 to 6, i.e. a self powered disposable cartridge.

The pen also includes an optical sensing package 1210 which comprises a PCB 1212 and an optical molding 1214.

The PCB 1212 includes an image sensor device 1216, a light source device 1218, processing chips 1220, radio transmitter chip 1222, display LEDs 1224 and aerial 1226. The aerial 1226 is connected to the PCB 1212 via wire 1228. The PCB optionally includes an accelerometer 1230. The image sensor device 1216 may be responsive to a narrow band of electromagnetic wavelengths or to a wide band. The light source device 1218 emits electromagnetic radiation at some or all of the wavelengths to which the sensor device responds. The image sensor device 1216 is preferably comprised of one or more charge coupled devices (CCD) or complementary metal oxide semiconductor (CMOS) image sensors. The light source 1218 is preferably comprised of one or more LEDs which emit electromagnetic radiation at one or more pre-selected wavelengths. The light sources and image sensors may be provided with one or more filters to filter out unwanted wavelengths. In some circumstances it may be desirable to have a first set of image sensors responsive only to infrared radiation and a second set only responsive to visible light. Similarly it may be desirable to have a first set of light sources which emit only to infrared radiation and a second set which emit only visible light. Other combinations of wavelengths are possible and the device may be responsive to more that two bands of wavelengths.

In our earlier applications U.S. Ser. No. 09/575,174 (docket no. NPS001US), U.S. Ser. No. 09/575,187 (docket no. NPP001US) and U.S. Ser. No. 09/575,129 (docket no. NPT002US) we have disclosed a system referred to as netpage which includes a pen for sensing invisible tags printed onto paper. The pen 1200 may include all of the functionality of the netpage pen disclosed in our earlier application and, in effect, be a netpage pen with a controllable marking function.

Light emitted by the light source device 1218 is guided by the optics molding 1214 to lens 1232 and then to the substrate in use. Light received by the lens is guided by the optics molding 1214 to the image sensor device 1216. Where there are multiple light sources or image sensors, the optics molding includes beam combiners and splitters and filters as required. The lens is preferably part of the optics molding and the front molding has an aperture 1233 through which light passes from and to the optics molding 1214. The aperture 1233 may be defined by the lack of material or by the provision of material substantially transparent to the light used by the image sensing device(s) 1216.

The PCB is mounted in slots 1234 in the chassis molding 1204 with the aerial extending in a slot (not shown) in the upper surface of the chassis molding 1204. The chassis molding slides into the body molding and is retained in position by the front molding 1206. The front molding 1206 is a snap fit in the body molding with a snap fitting (not shown) engaging in recess 1236 of the body molding. The pen PCB 1212 engages the contacts of cartridge PCB 1144 to receive power from the battery carried by the cartridge and to control the operation of the printhead 1120. Control of the printhead depends on the application and the processor and will be discussed in later sections of this document.

CONTROL OF PRINTHEAD

Figure 11:
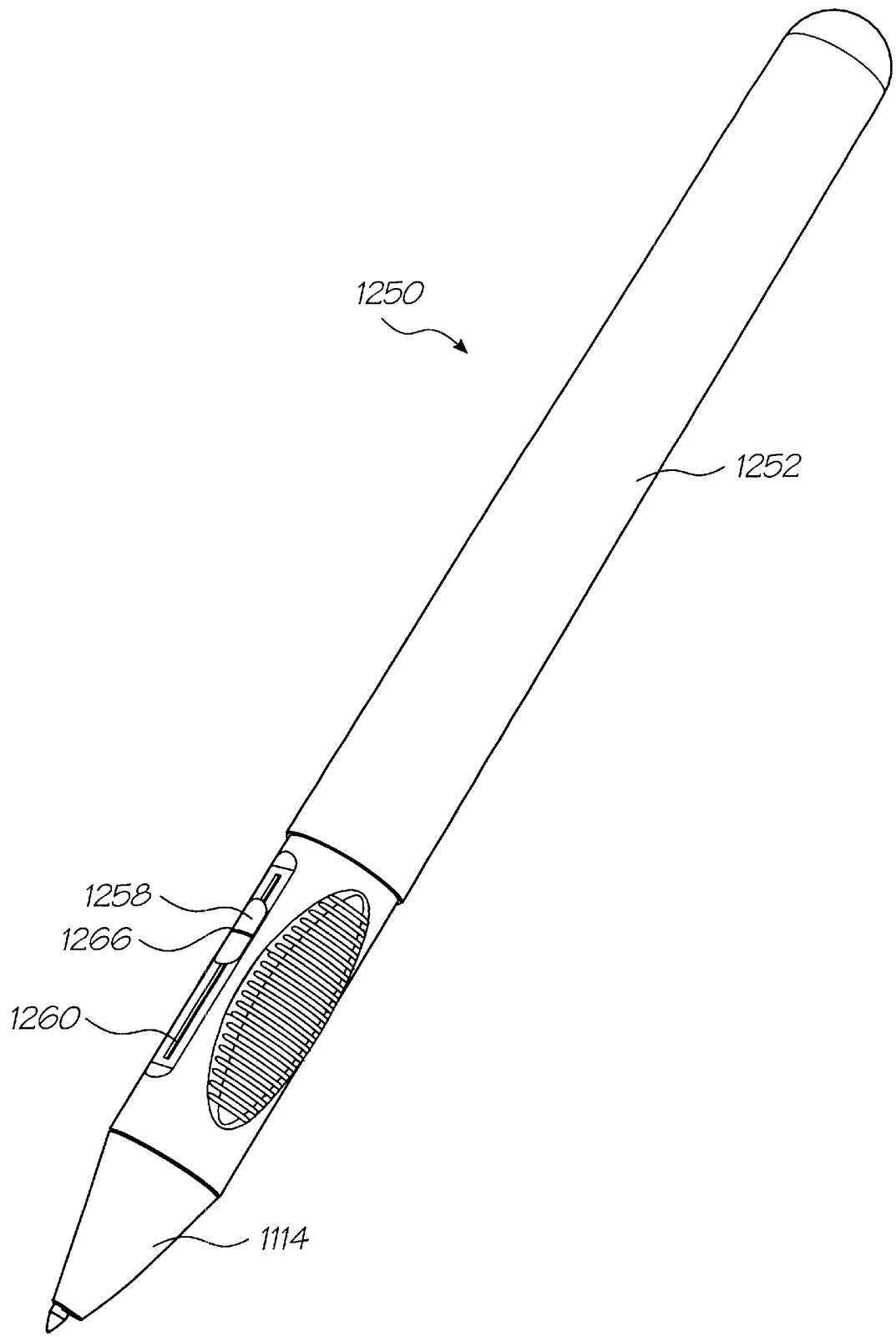
FIG. 11 shows a perspective view of a pen according to a fourth embodiment of the invention.
Figure 12:
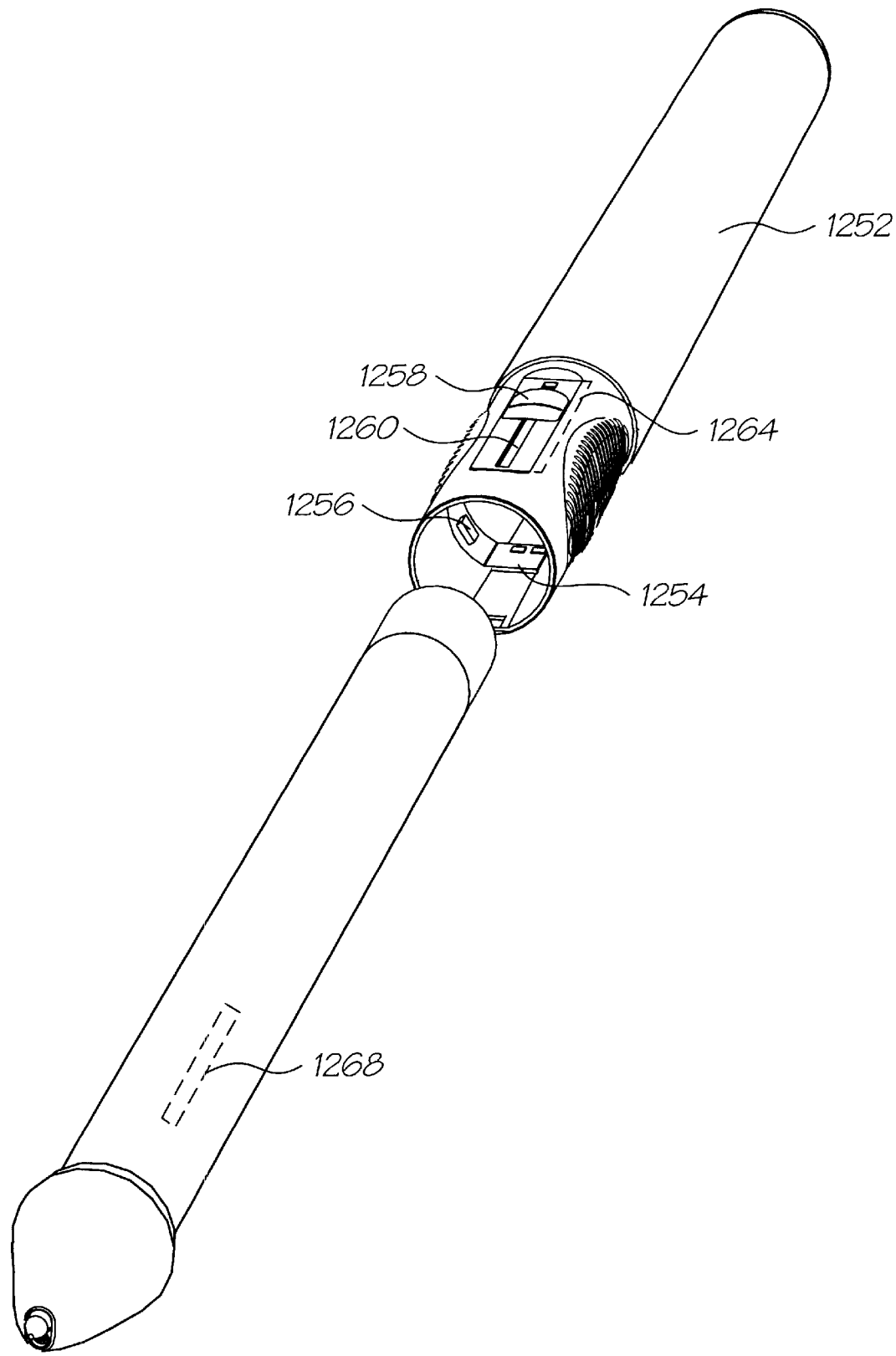
FIG. 12 shows an exploded perspective view of the pen of FIG. 11.
Figure 13:
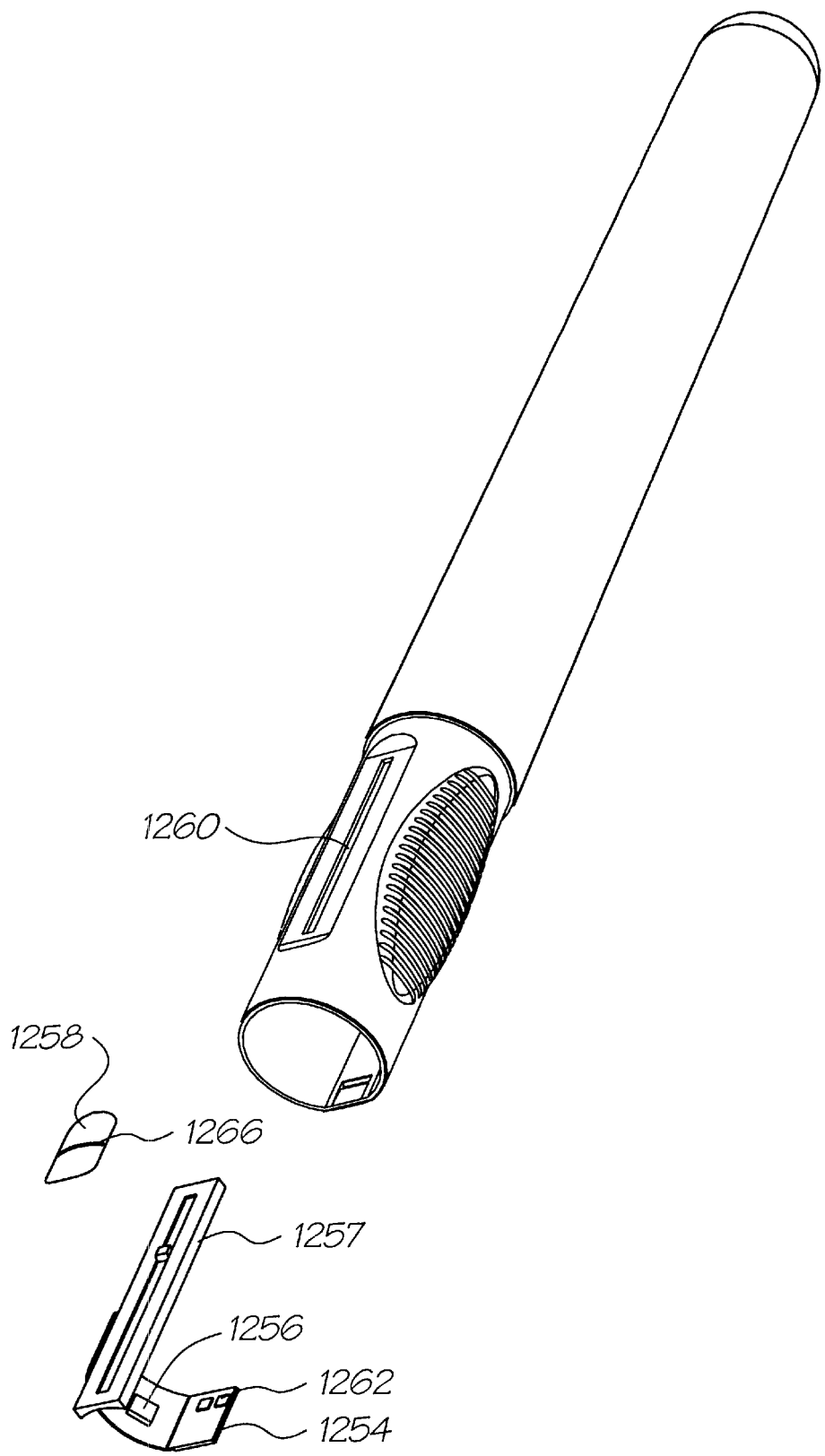
FIG. 13 shows an exploded perspective view of part of the pen of FIG. 11.

FIGS. 11 to 13 show a pen 1250 according to a further embodiment of the 30 invention. The pen has a simple tubular body 1252 in which an ink cartridge 1114 is received. The cartridge 1114 may be a monochrome ink cartridge or a color cartridge. The body 1252 includes a PCB 1254 on which is mounted a processor chip or chips 1256 and a potentiometer 1257. The potentiometer is positioned to lie under the upper surface of the body 1252 and is connected to an external slider 1258. The slider 1258 slides in slot 1260 of the body. The PCB 1254 includes contact pads 1262 which engage contacts 1146 o f the cartridge 1114 to receive power and to control the printhead 1120.

The potentiometer is capable of adjusting one characteristic of the ink deposited by the printhead 1120. This may be the amount of ink deposited, the width of the line produced, the color of the ink deposited (in a color cartridge) or any other attribute.

As mentioned earlier the cartridges may include information which identifies one or more characteristics of the cartridge, such as whether the cartridge is a mono or color cartridge, the maximum width of line possible, etc. The processor 1256 of the pen PCB 1254 can obtain this information from the cartridge and change the relevant attribute of the printhead 1120. The artridge 1114 may include an area 1268 which indicates the attribute that may be modified. The information may be printed on the cartridge body directly or attached by way of a sticker. The body may include a transparent area 1264 adjacent the slider 1256 through which the area 1268 is visible. Thus, for instance, a color cartridge who se color output may be modified may have a rainbow stripe at area 1268 which is visible through area 1264. The user can select any color merely by sliding the slider 1258 so that index line 1266 is adjacent the required color. A mono cartridge with adjustable line width can have a wedge representing the line width extending axially. Obviously other attributes are controllable.

PRINTHEAD AND STYLUS NIB

Figure 5:
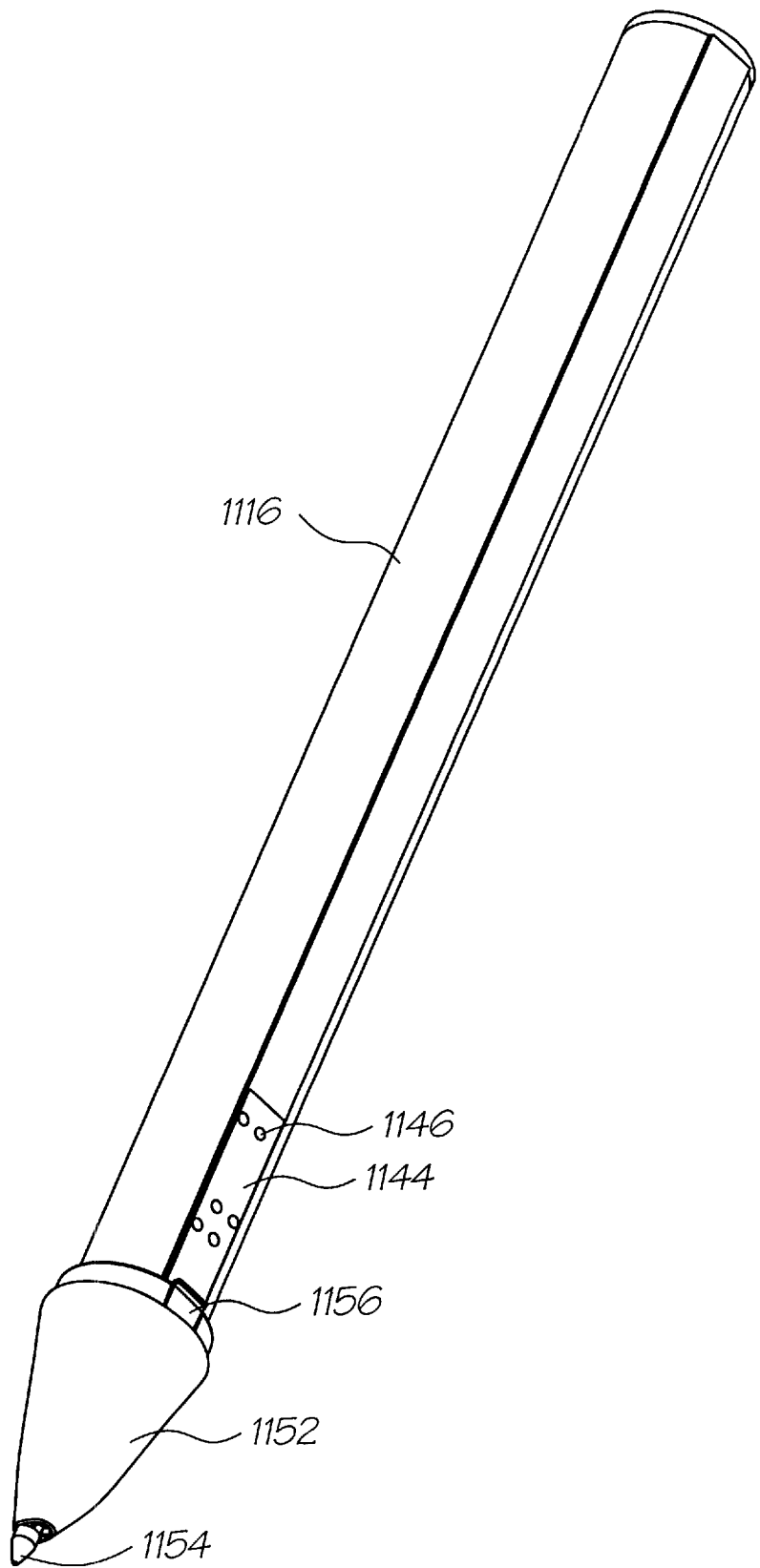
FIG. 5 shows a perspective view of a cartridge for use in the pen shown in FIG. 1.
Figure 6:
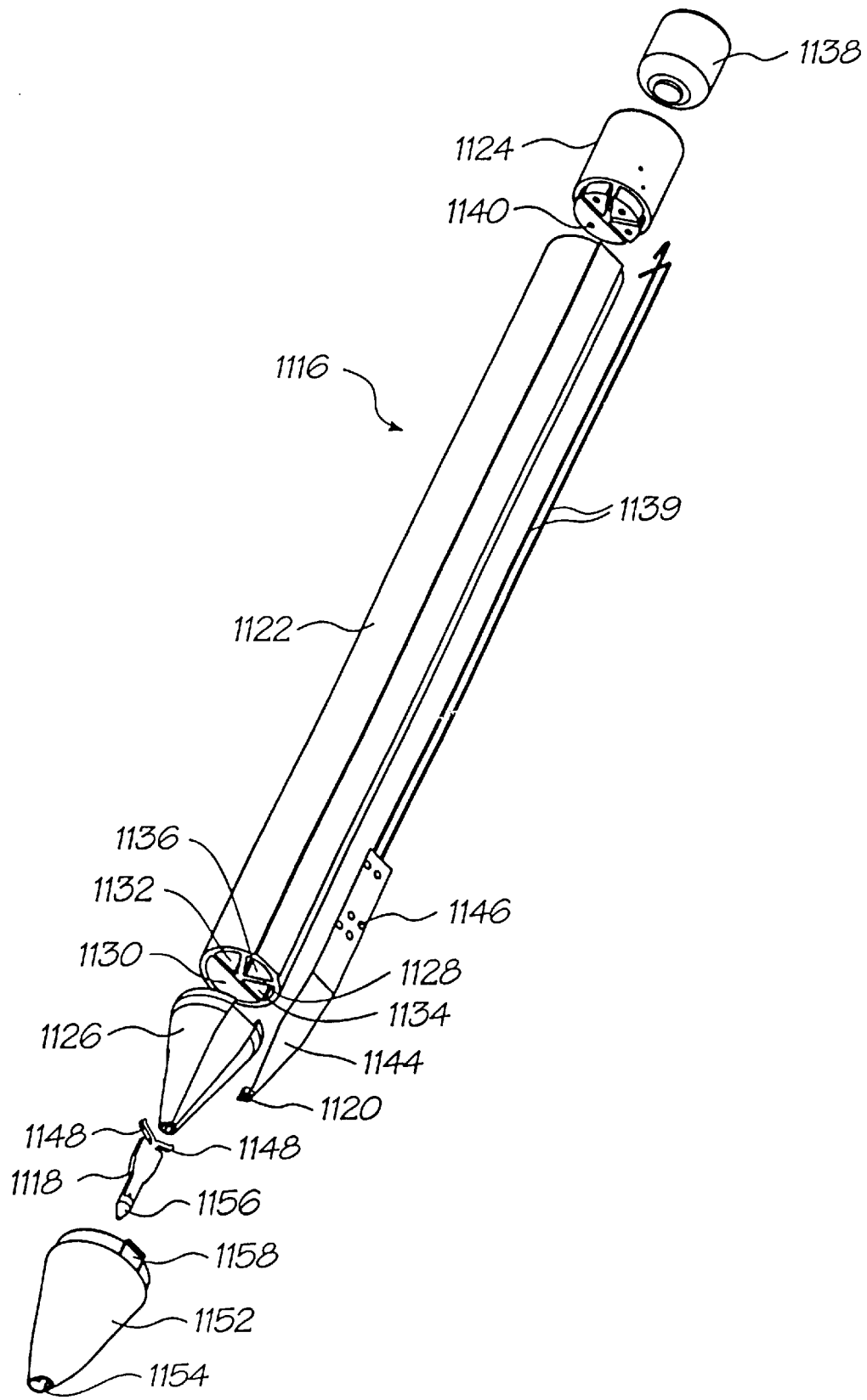
FIG. 6 shows an exploded perspective view of the cartridge of FIG. 5.
Figure 14:
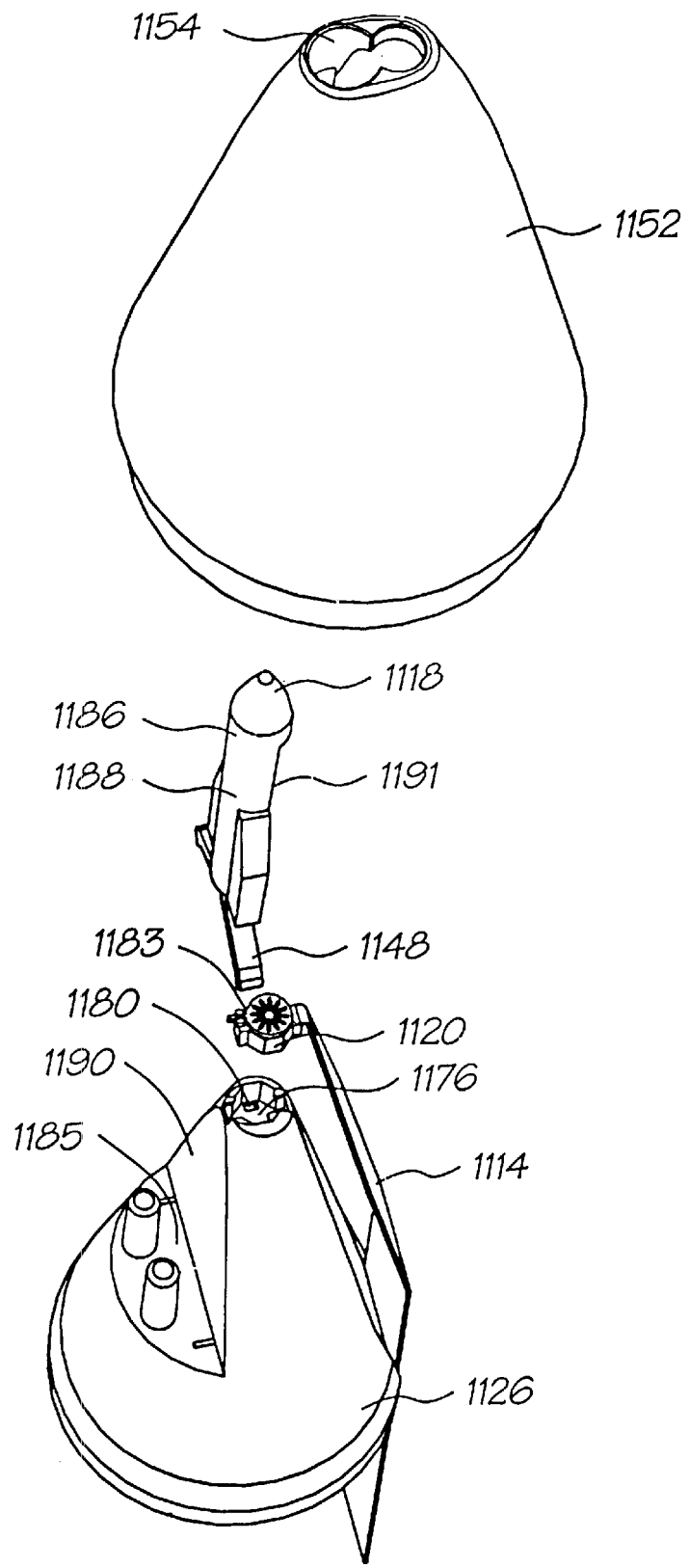
FIG. 14 shows a first exploded perspective view of part of the cartridge of FIGS. 5, 6 & 8.
Figure 15:
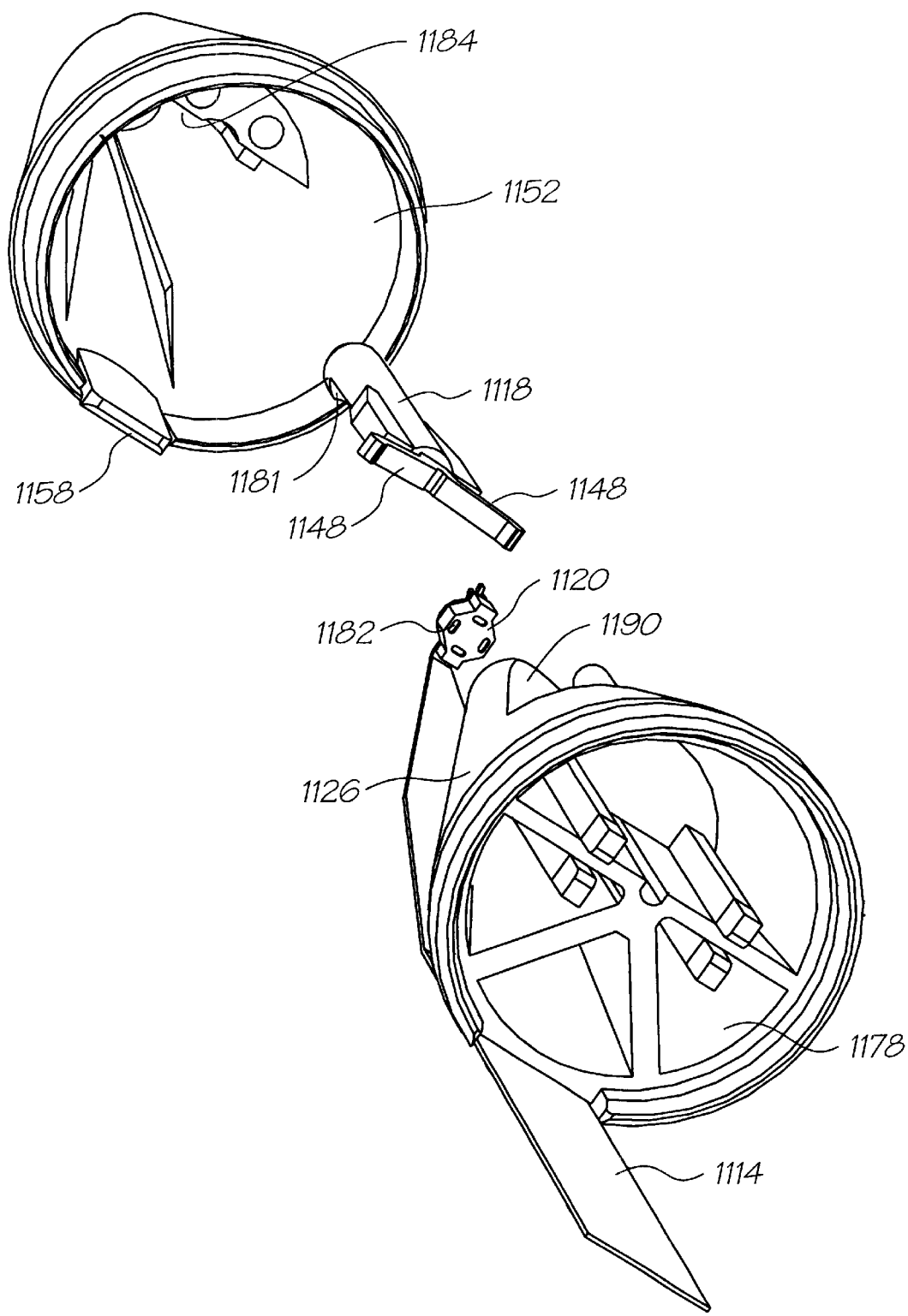
FIG. 15 shows a second exploded perspective view of part of the cartridge of FIGS. 5, 6 & 8.

FIGS. 14 and 15 show in detail a preferred arrangement printhead and stylus nib for use in the cartridge and pen of the present invention and as used in the cartridges of FIGS. 5, 6 & 8. As such the same parts have the same reference numbers.

The printhead 1120 is mounted on PCB 1144 and is received in a recess 1176 in end cap 1126. Both the printhead and the recess are non-circular too aid in correct orientation. The end cap 1126 includes four ink galleries 1178 which each exit into the recess 1176 at ink outlets 1180. These outlets communicate with ink inlets 1182 of printhead 1120.

The stylus nib 1118 is mounted in a slot 1184 of nib cap 1152 and held in place by surface 1190 of the end cap 1126. The cantilevered arms 1148 bear against land 1185 and bias the stylus nib outwards. The front portion 1186 of the stylus nib is circular in cross section but the back portion 1188 has a flat surface 1191 which slides over surface 1190 of end cap 1126.

The stylus nib includes a slot 1181 which extends obliquely along the flat surface 1191. The printhead 1120 includes a rotary capper 1183. The capper is movable between first and second operative positions. In the first position the ink ejection nozzles of the printhead are covered and preferably sealed to prevent drying of the ink in the printhead and ingress of foreign material or both. In the second position the ink ejection nozzles of the printhead are not covered and the printhead may operate. The capper 1183 includes an arm 1185 which engages the slot 1181. Thus as the stylus nib moves in and out relative to the printhead the capper 1183 is caused to rotate. When the stylus nib is under no load and is fully extended the capper is in the first position and when the stylus nib is depressed the capper is in the second position. The capper 1183 may incorporate an on/off switch for the printhead 1120, so the printhead can only operate where the capper is in the second operative position. The slot may have an oblique portion to open and close the capper and then a portion extending axially where no movement of the capper occurs with stylus nib movement.

PRINTHEAD AND CAPPER CONSTRUCTION

The construction and arrangement of the printhead 1120 and capper 1183 are shown in FIGS. 16 to 24 inclusive. The printhead 1120 is an assembly of four layers 1302, 1304, 1306 and 1308 of a semiconductor material. Layer 1306 is a layer of electrically active semiconductor elements, including MEMS ink ejection devices 1310. Layer 1306 has been constructed using standard semiconductor fabrication techniques. Layers 1302 and 1304 are electrically inactive in the printhead and provide passageways to supply the ink to the ink ejection devices 1310 from the ink inlets 1182. The layer 1308 is also electrically inactive and forms a guard with apertures 1320 above each ink ejection device 1310 to allow ink to be ejected from the printhead. The layers 1302, 1304 and 1308 need not be the same material as the layer 1306 or even a semiconductor but by using the same material one avoids problems with material interfaces. Further, by using semiconductor material for all components the entire assembly may be manufactured using semiconductor fabrication techniques.

The printhead 1120 has four ink inlets 1182 and the ink ejection devices 1310 are arranged into twelve sets, each of which extends roughly radially outwards from the center 1300 of the printhead. Every fourth radial line of ink ejection devices 1310 is connected to the same ink inlet. Ink ejection devices connected to the same ink inlet constitute a set of ink ejection devices. The ink ejection devices 1310 are arranged on alternate sides of a radial line, which results in closer radial spacing of their centers.(Is there any other reason?). The twelve "lines" of ink ejection devices 1310 are arranged symmetrically about the center 1300 of the printhead, at a spacing of 30°. It will be appreciated that the number of "lines" of ink ejection devices 1310 may be more or less than twelve. Similarly there may be more or less than four ink inlets 1182. Preferably there are an equal number of lines for each ink inlet 1182. If a single ink is used in the cartridge the ink inlets need not feed equal numbers of "lines" of ink ejection devices.

The layer 1306 includes a tab 1311 on which there are provided a number of sets of electrical control contacts 1312. For clarity only four contacts are shown; it will be appreciated that there may be more, depending on the number of different color inks used and the degree of control desired over each individual ink ejection device 1310 and other requirements. The printhead is mounted on the PCB 1144 by bonding the tab onto the PCB 1144. The electrical contacts 1312 engage corresponding contacts (not shown) on the PCB 1144. The layer 1306 includes control circuitry for each ink ejection device to control the device when turned on. However, generally, all higher level control, such as what color inks to print and in what relative quantities, is carried out externally of the printhead. This may be by circuitry on the PCB 1144 or pen PCBs such as 1212 of the FIGS. 9 & 10 device or 1254 of the FIGS. 11, 12 & 13 device. These higher level controls are passed to the printhead 1120 via contacts 1312. There is preferably at least one set of contacts 1312 for each set of ink ejection devices. However each line or each individual ink ejection device may be addressable. At its simplest, each set may be merely turned on or off by the control signals.

Figure 16:
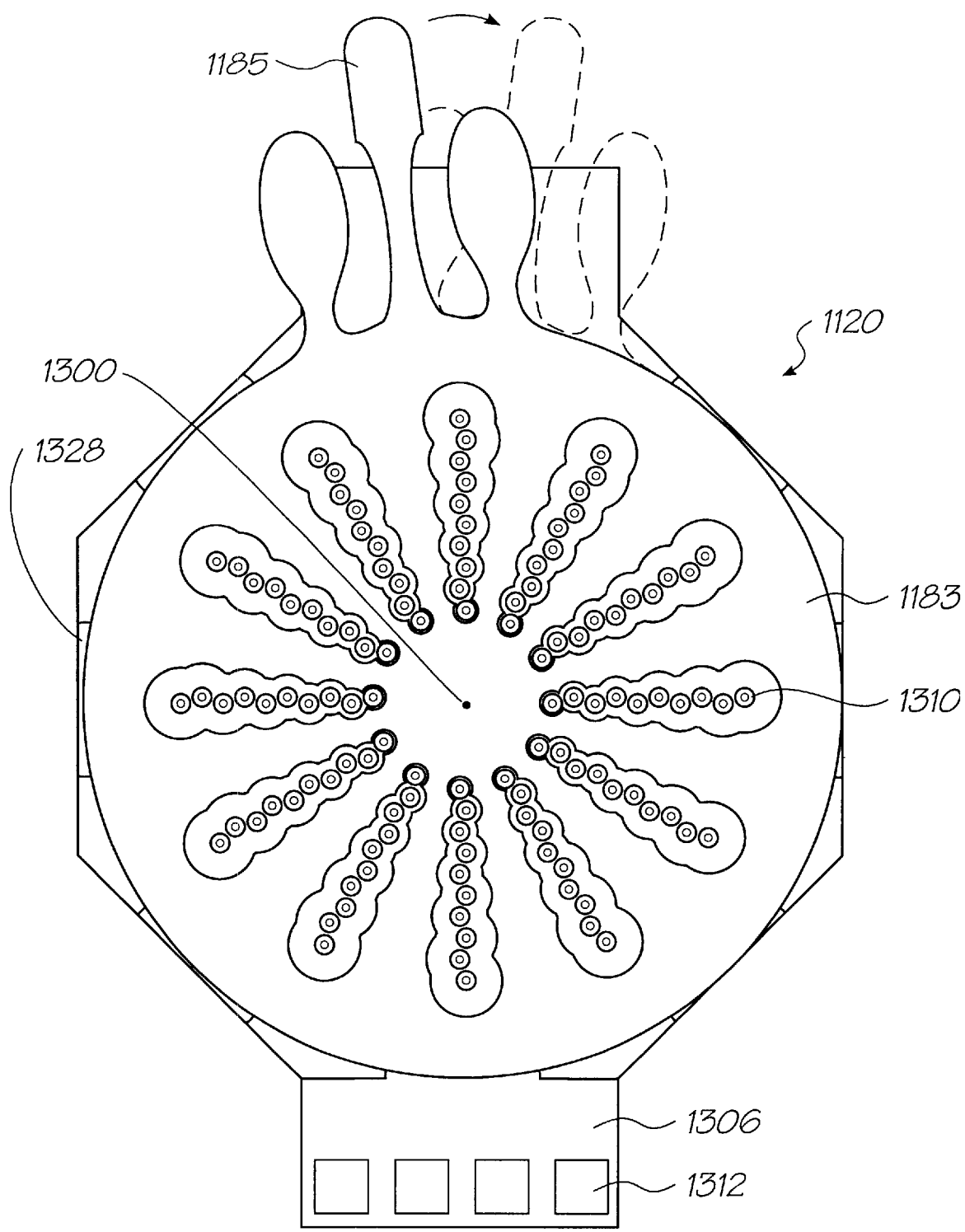
FIG. 16 shows a plan view of the printhead used in the cartridges of FIGS. 5, 6 & 8.
Figure 17:
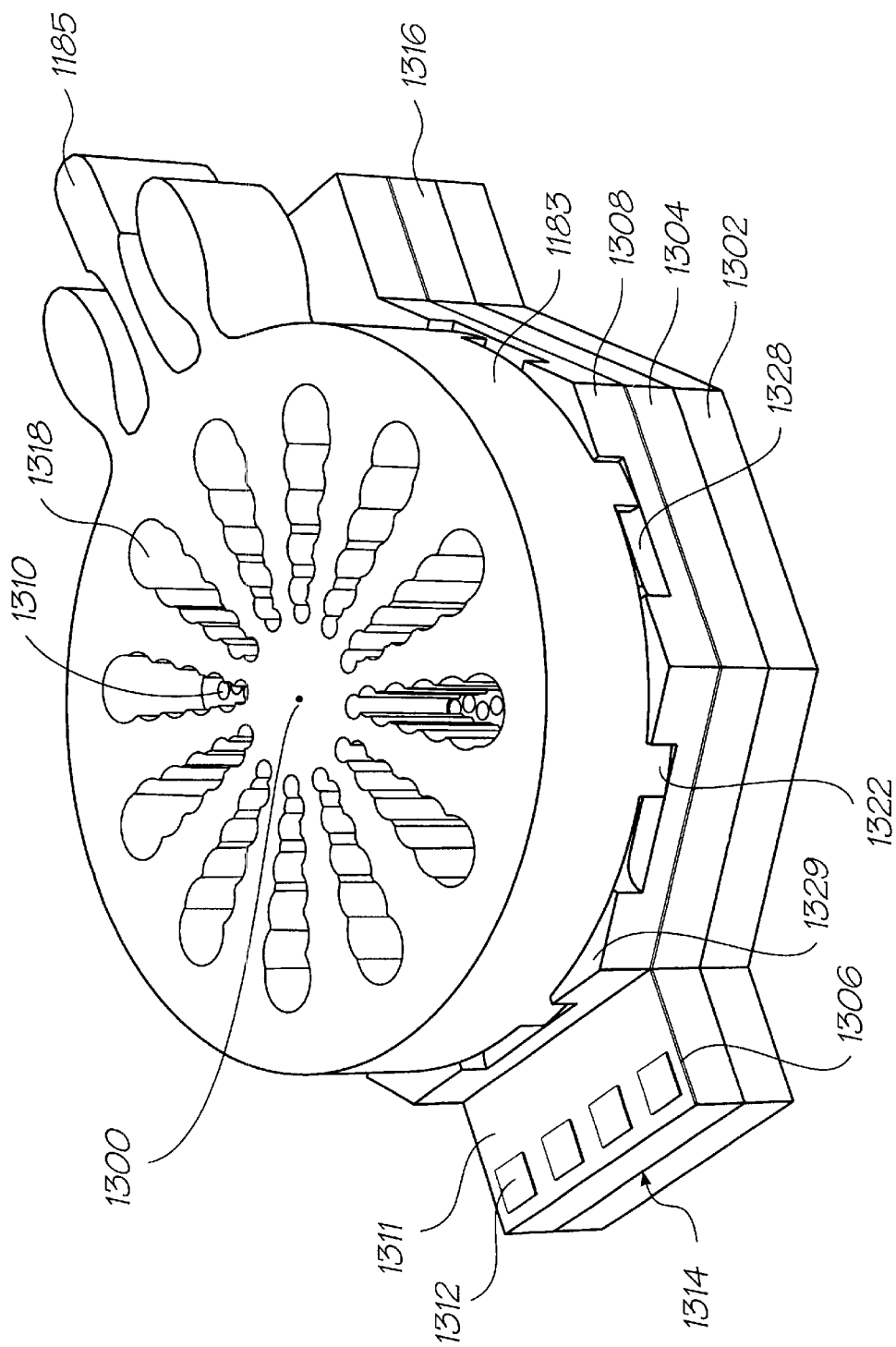
FIG. 17 shows a perspective view from above of the printhead of FIG. 16 in an open position.
Figure 18:
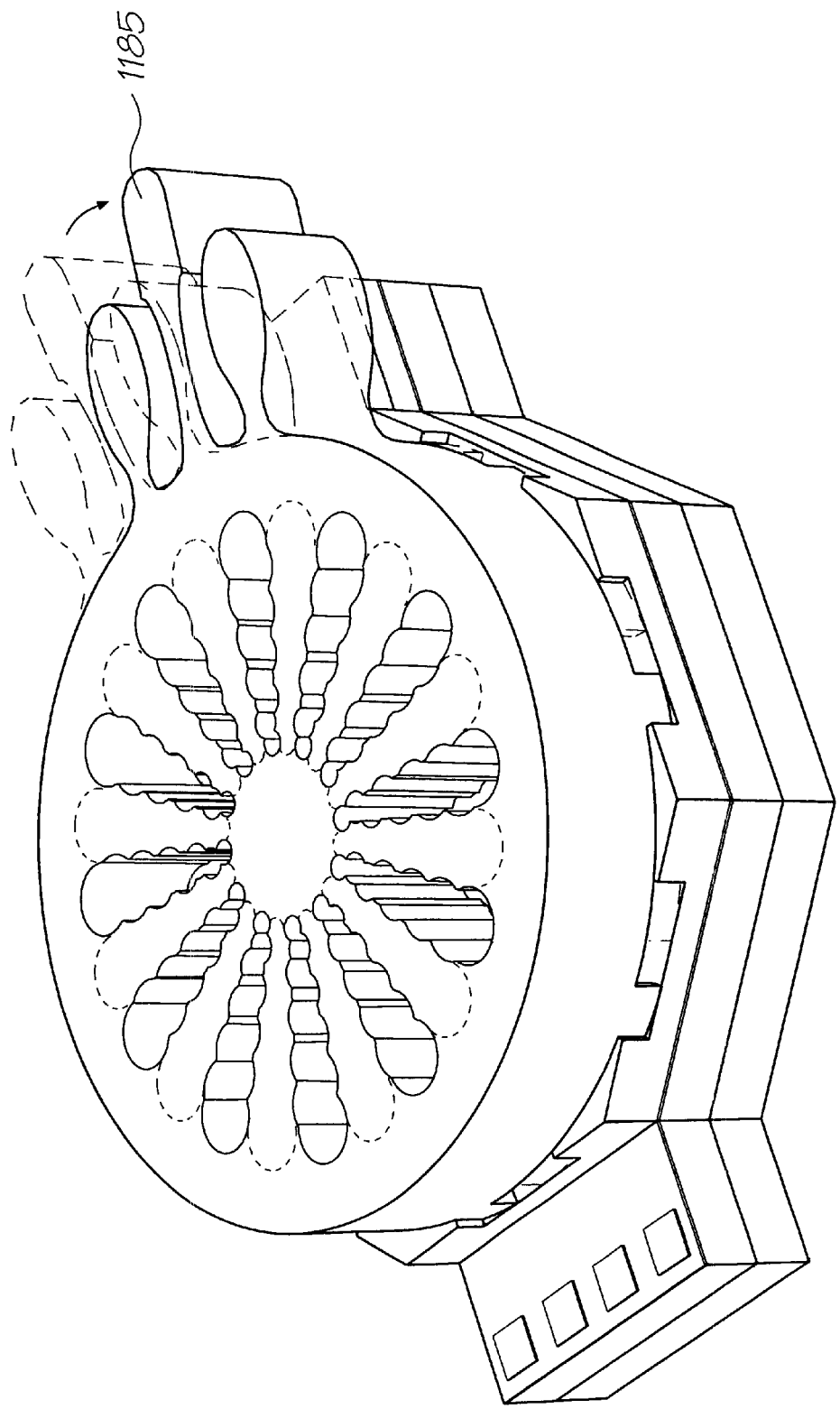
FIG. 18 shows a perspective view from above of the printhead of FIG. 16 in a closed position.

As seen in FIG. 16 in plan view the printhead 1120 has a substantially octagonal profile with tabs 1314 and 1316 extending from opposite faces of the octagon. It will be noted that tab 1314 is formed of layers 1302, 1304 and 1306 only, whilst tab 1316 is formed of all four layers 1302, 1304, 1306 and 1308. This enables the PCB 1144 to be bonded to the layer 1306 without extending above the top of layer 1308. The octagonal shape with tabs also aids in locating the printhead in the recess 1176 in the end cap 1126.

The capper 1183 is also preferably formed of the same semiconductor material as the print head and is mounted on the printhead for rotation about the printhead's center 1300. As with the non electrically active layers, the capper need not be the same material as the print head or even be a semiconductor. The capper may be rotated between an open position (see FIG. 17) and a closed position (see FIG. 18). The open position is shown, with the closed position show in dotted outline in FIGS. 16 and 18. The capper 1183 has twelve radially extending apertures 1318. These apertures are sized and arranged so that in the open position all of the ink ejection devices are free to eject ink through the apertures. In the closed position the apertures 1318 overlie material between the lines of ink ejection devices, and the material of the capper between the apertures 1318 overlies the apertures 1320 in the upper layer 1308. Thus ink cannot escape from the printhead and foreign material cannot enter into the apertures 1320 and the ink ejection devices to possibly cause a blockage. The apertures 1318 are preferably formed in the capper 1183 using standard semiconductor etching methods. In the embodiment shown each aperture is equivalent to a series of overlapping cylindrical bores, the diameter of which is a function of radial distance from the capper's center 1300. Alternatively, the apertures may be defined by two radially extending lines at a small angle to each other. It will be appreciated that the outside of the capper moves more than the inside when rotated so the apertures need to increase in width as the radial distance increases.

The capper is substantially planar with eight legs 1322 extending downwards from the periphery of the lower surface 1326. These legs are spaced equally about the circumference and engage in corresponding slots 1328 formed in the peripheral edge of the upper surface 1329 of the upper layer 1308. The slots are rectangular with rounded inner corners. The inner surface 1330 of the slots 1328 and the inner surface of the legs may be arcuate and centered on the printhead's center 1300 to aid in ensuring the capper rotates about the central axis 1300. However this is not essential. In the embodiment shown, each face of the octagon has a slot 1328 but this is not essential and, for instance, only alternate faces may have a slot therein. The symmetry of the legs 1322 and slots 1328 is also not essential.

Rotation of the capper is caused by engaging arm 1185 in the angled slot 1181 in the stylus nib. Rotation of the capper is ultimately limited by the legs 1322 and slots 1328. To prevent damage to the capper, printhead or the stylus nib, the arm 1185 has a narrowed portion 1334. In the event that the stylus nib is pushed in too far, the arm 1185 flexes about the narrowed portion 1334. In addition guard arms 1336 are provided on either side of the arm 1185 and also serve to limit rotation. The recess 1176 into which the printhead is inserted has an opening in which the guard arms are located. If for some reason the capper is rotated too much, the guard arms contact the side of the opening and limit rotation before the legs 1322 contact the ends of the slots 1328.

PRINTHEAD ACTUATION

Whilst the pen may be turned on, it is desirable that the print head only actuate when the stylus nib is pressed against a substrate. The stylus nib may cause a simple on off switch to close as it moves into the pen. Alternatively a force sensor may measure the amount of force applied to the stylus nib. In this regard the cantilevered arms 1148 may be used directly as electrical force sensors. Alternatively a discrete force sensor may be acted upon by the inner end of the stylus nib. Where a force sensor is utilized, it may be used merely to turn the printhead on or off or to (electronically) control the rate of ink ejection with a higher force resulting in a higher ejection rate, for instance. The force sensed may be used by a controller to control other attributes, such as the line width. Rotation of the capper may also cause an on/off switch to change state.

PRINTHEAD INK PASSAGEWAYS

The printhead has the different color ink ejection devices arranged radially and this presents problems in supplying ink to the ejection devices where the different color ink ejection devices are interleaved. In conventional printers the ink ejection devices are arranged in parallel rows and so all the different inks may be supplied to each row from either or both ends of the row. In a radial arrangement this is not possible.

The rear surface of the bottom layer 1302 is provided with four ink inlets 1182. These inlets are oval shaped on the rear surface for approximately half the thickness of the layer 1302 and then continue as a circular aperture 1340 through to the upper surface. The rear surface of the layer 1302 also has four grooves 1342, 1344, 1346 and 1348 located in the central region. There are a number of holes that extend from the grooves through the layer 1302 (see FIGS. 21 and 24). The lower surface of the lower layer 1302 seals against the end cap 1126 so these grooves define sealed passageways.

Figure 19:
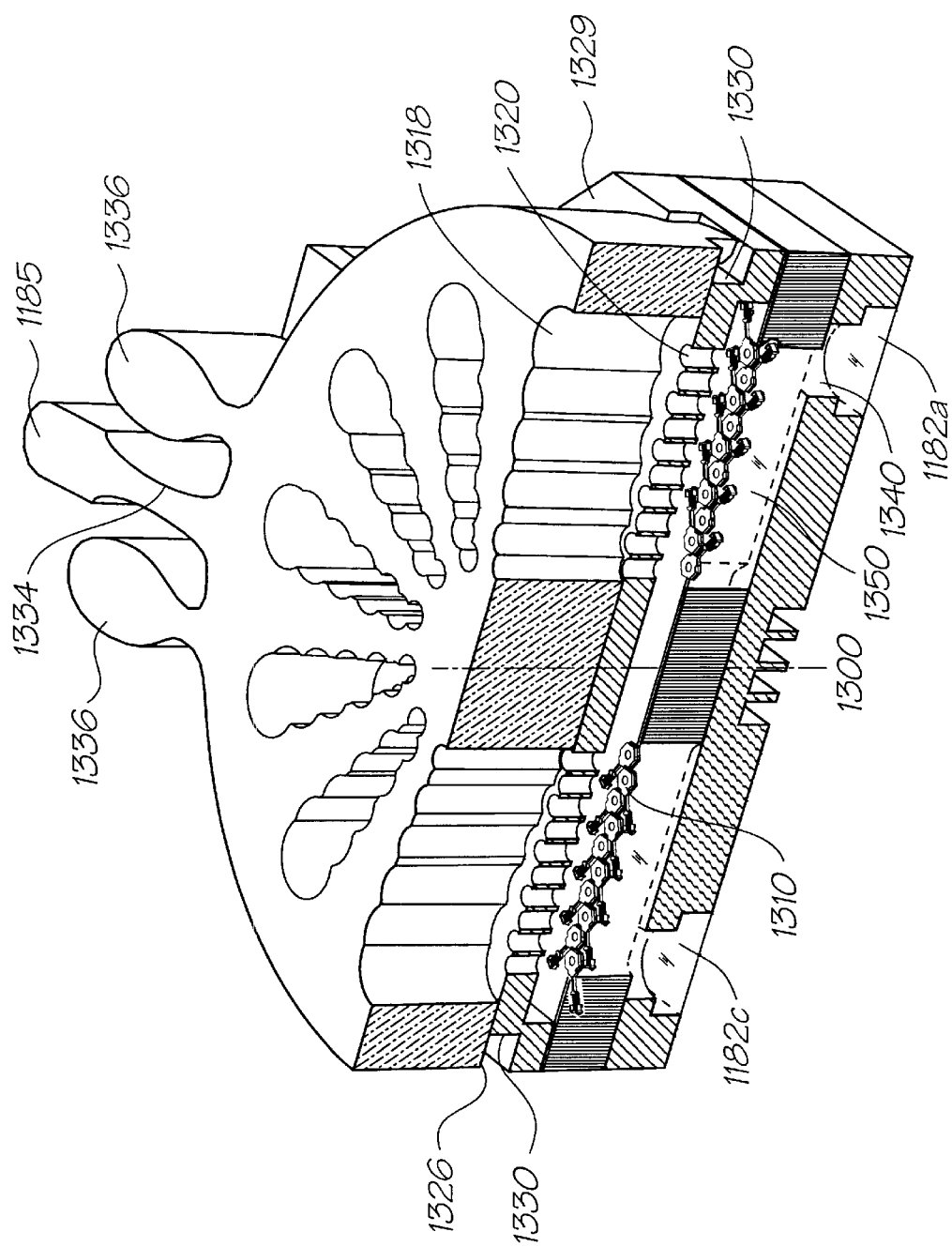
FIG. 19 shows a perspective cross sectional view from above of the printhead of FIG. 16 in an open position.
Figure 20:
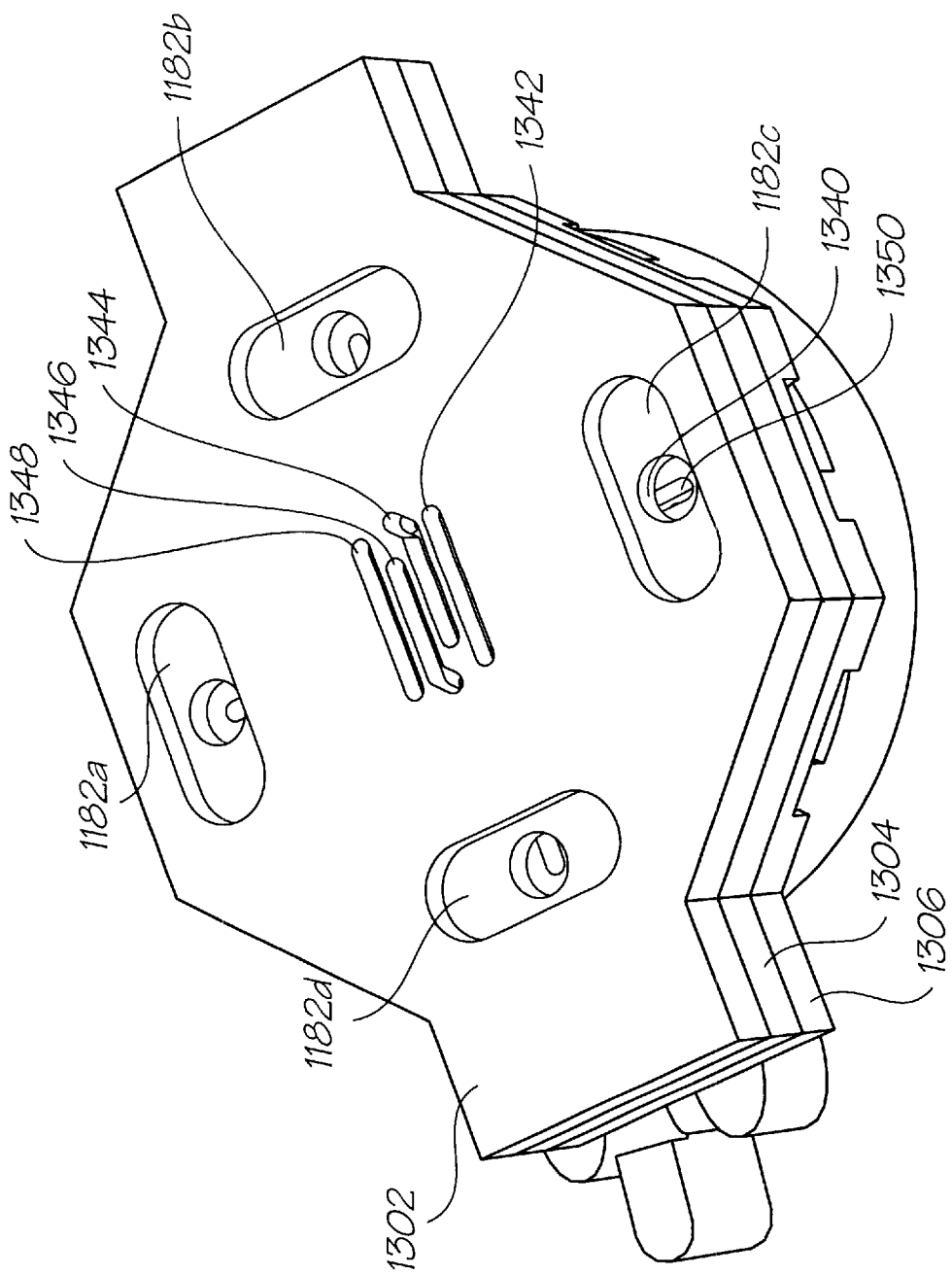
FIG. 20 shows a perspective view from below of the printhead of FIG. 16 in an open position.
Figure 20A:
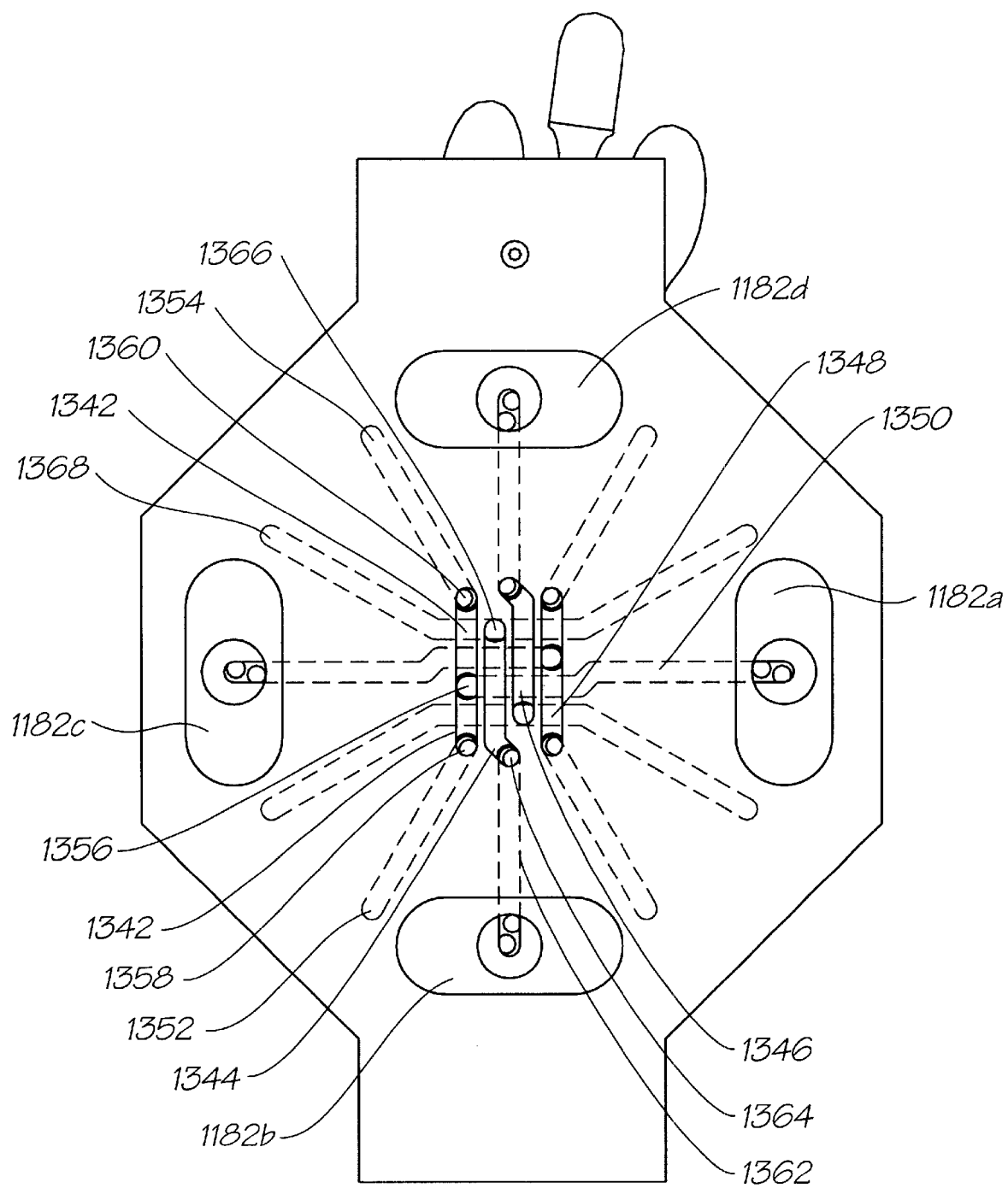
FIG. 20a shows a plan view from below of the printhead of FIG. 16 in an open position.
Figure 21:
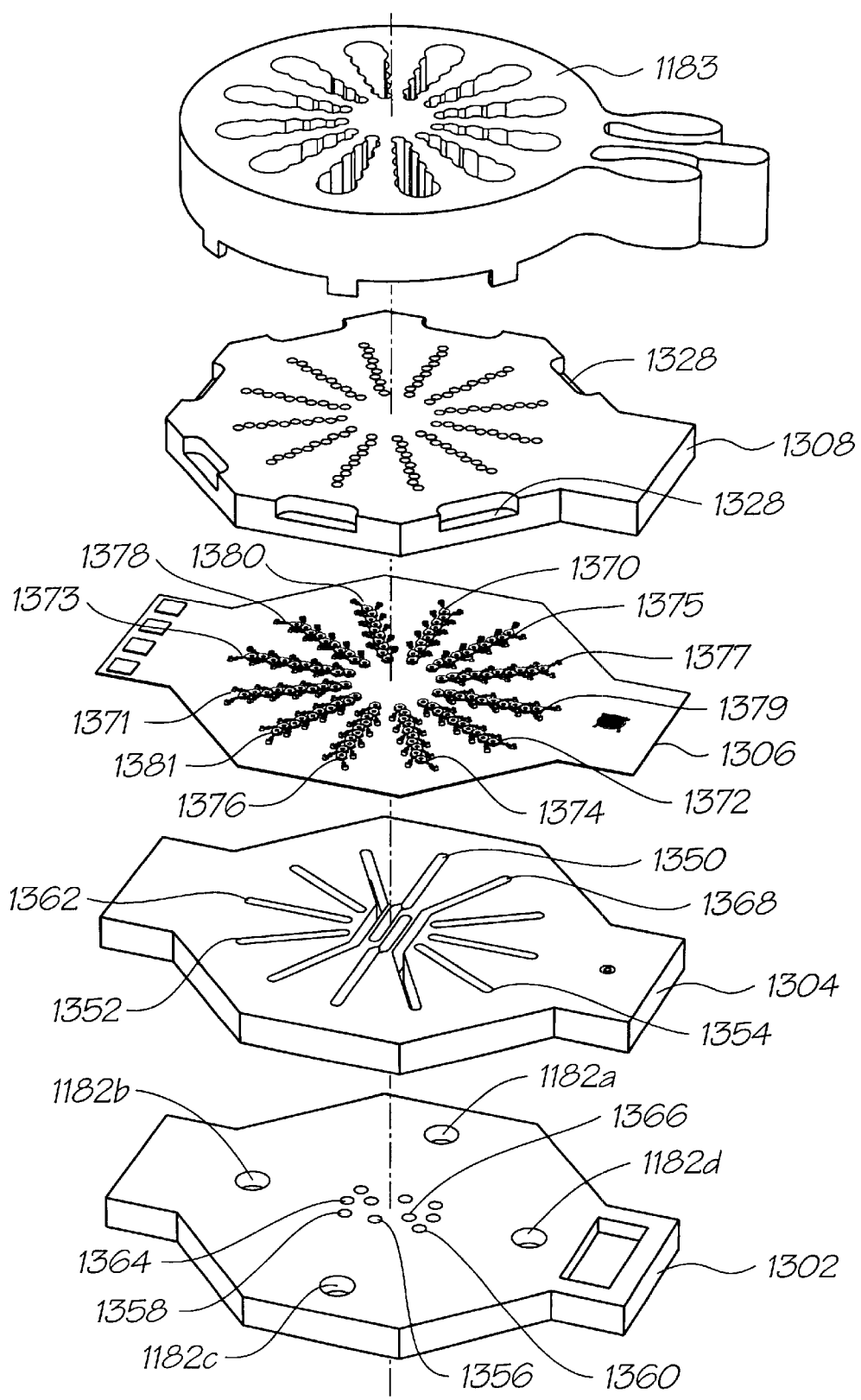
FIG. 21 shows an exploded perspective view from above of the printhead of FIG. 16 in an open position.
Figure 22:
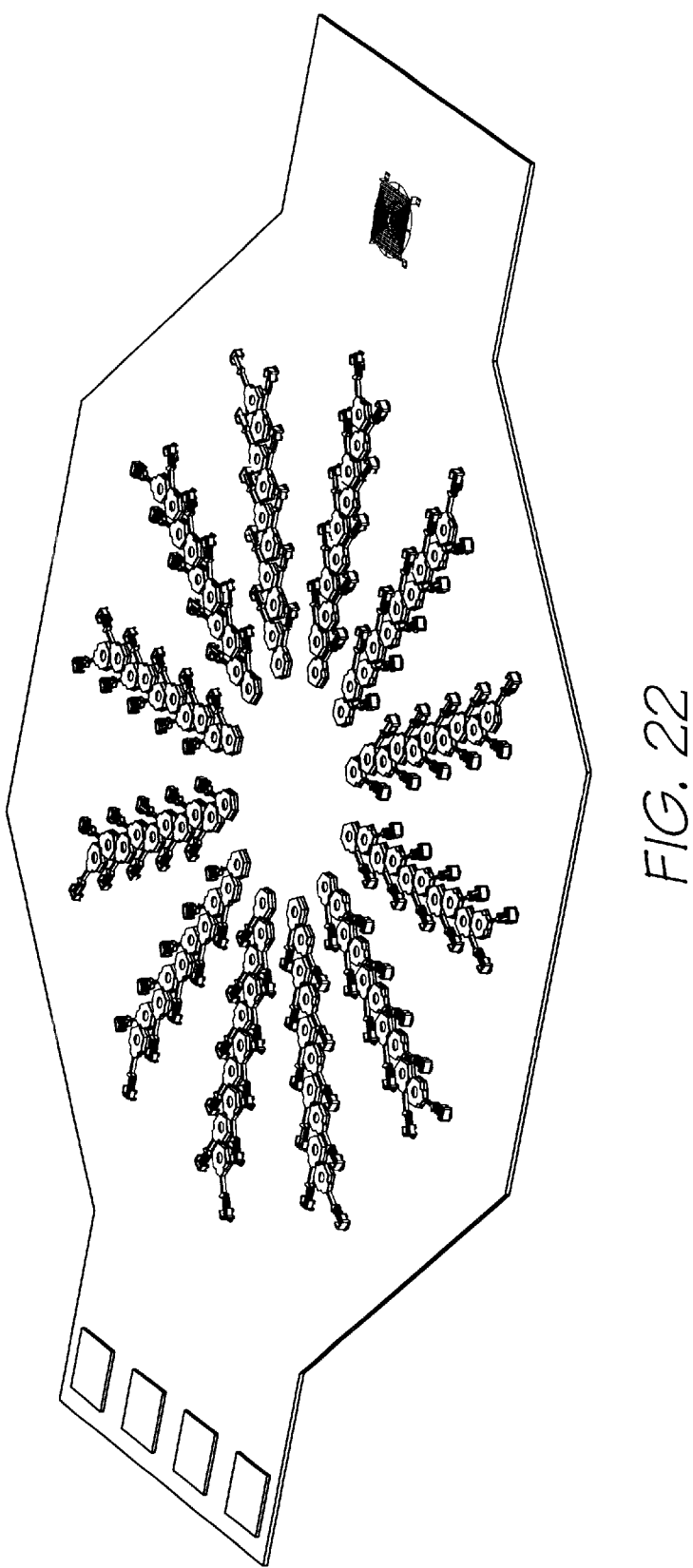
FIG. 22 shows a perspective view from above of the MEMS inkjet layer of the printhead of FIG. 16.

As mentioned above, there are four ink inlets and twelve lines of ink ejection devices 1310, so three lines of ink ejection devices need to receive ink from the same ink inlet. Referring to FIG. 21, a first set of three lines of ink ejection devices is numbered as 1370, 1371 & 1372. This set receives ink supplied by ink inlet 1182a. The second layer 1304 has a slot 1350 extending through its thickness under the line of ink ejection devices. The outer end of the slot 1350 is aligned with the ink inlet 1182a and so supplies ink to the devices of line 1370 above it, as seen in FIG. 19. The other end of the slot 1350 aligns with hole 1356 in layer 1302 to communicate with groove 1342. The ends of groove 1342 have holes 1358 & 1360 to the upper surface and these communicate with slots 1352 and 1354, respectively. These slots supply ink to lines 1371 and 1372, respectively. The supply of ink from opposing ink inlet 1182c to respective lines 1376, 1377 & 1378 of ink ejection devices is accomplished with a mirror image of the slots and grooves.

Ink inlet 1182b communicates with slot 1362 and so supplies line 1373 of ink ejection devices. The inner end of slot 1362 communicates with hole 1364 in layer 1302. This hole 1364 communicates with groove 1344. The other end of groove 1344 has a hole 1366 extending to the upper surface which communicates with slot 1368. The slot 1368 extends under lines 1374 and 1375 of ink ejection devices and so all three lines receive the same ink. The supply of ink from inlet 1182d to the lines 1379, 1380 & 1381 is achieved with a mirror image arrangement of slots and grooves.

CONTROL OF ATTRIBUTES OF PRINTED INK
Color Control Via Potentiometers

Figure 23:
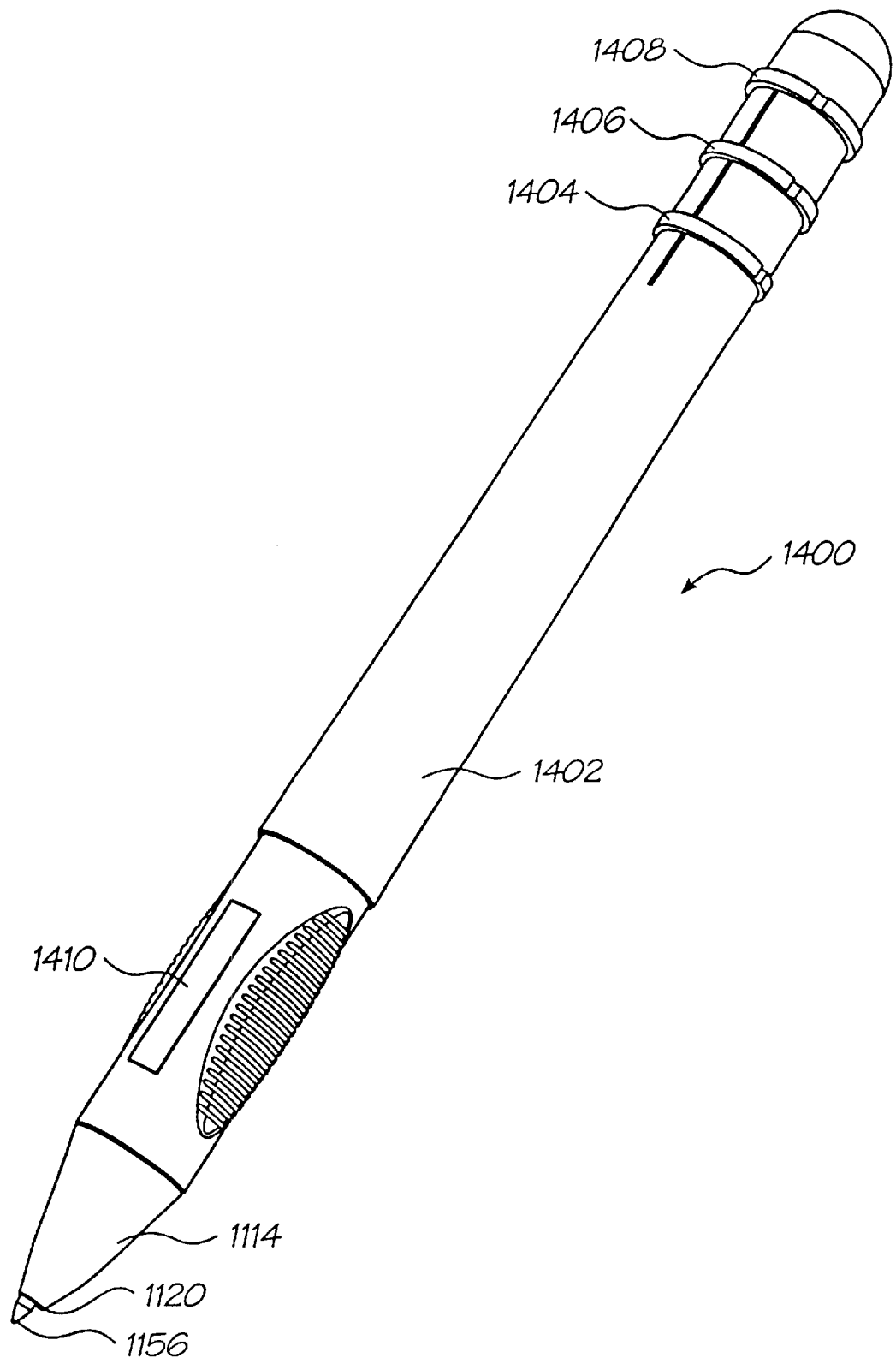
FIG. 23 shows a perspective view of a pen according to a further embodiment of the invention.

FIG. 23 shows a four color pen 1400 having a pen body 1402 and a replaceable four color ink cartridge 1114. The pen body 1401 includes three rotary potentiometers 1404, 1406 & 1408. The potentiometers control the hue, saturation and brightness value respectively. The pen body also includes a display 1410 which displays a color corresponding to the settings. The display 1410 is preferably an organic light emitting diode (OLED) display capable of displaying the required colors. Alternatively, the display may be a combination of several different colored pulse width modulated LEDs or a color LCD. A passive display may be provided with a graphical representation of the effect of each control printed on the surface adjacent the respective control. A further variation provides a display which outputs numeric values of Hve, Saturation and Value (HSV) or text. The display may be omitted and the user may merely rely on drawing a sample line to obtain the desired attributes. The potentiometers may be linear rather than rotary potentiometers.

It will be appreciated that other color control models may be used. Instead of controlling HSV the potentiometers may control Red, Green, & Blue (RGB) attributes or the relative amounts of Cyan, Magenta and Yellow (CMY) inks deposited. The pen may be provided with an ability to allow the potentiometers to change any of HSV, RGB or CMY.

Color Control Via Cycle Buttons

Figure 24:
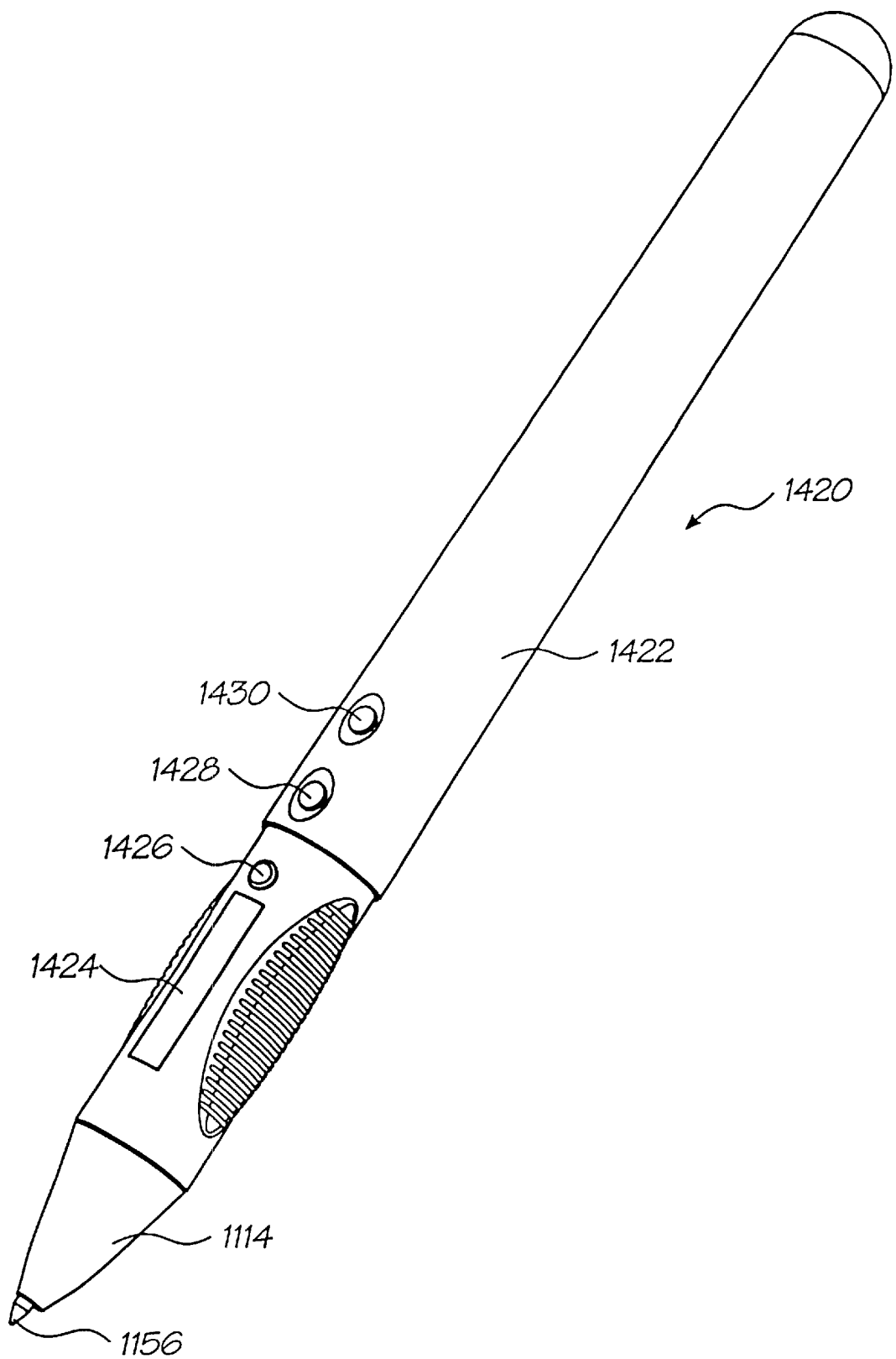
FIG. 24 shows a perspective view of a pen according to a further embodiment of the invention.

FIG. 24 shows a pen 1420 including a pen body 1422 and a replaceable four color ink cartridge 1114. The pen body 1422 includes a color display 1424, preferably an OLED and three control buttons 1426, 1428 & 1430. The pen body includes non volatile memory in which is stored a plurality of different color values. The control button 1426 is operable to place the pen in a "select" mode, whereby the buttons 1428 and 1430 cause the pen to cycle through the available stored values, with the display 1424 displaying the corresponding color to be printed. The buttons 1428 & 1430 cause the pen to scroll through the values in different directions. The button 1430 may be omitted if scrolling in one direction is acceptable. Once the desired value is displayed, it may be selected via the button 1426 and the pen will then produce the selected combination until it is changed.

Line Attribute Control Via Cycle Buttons

Figure 25:
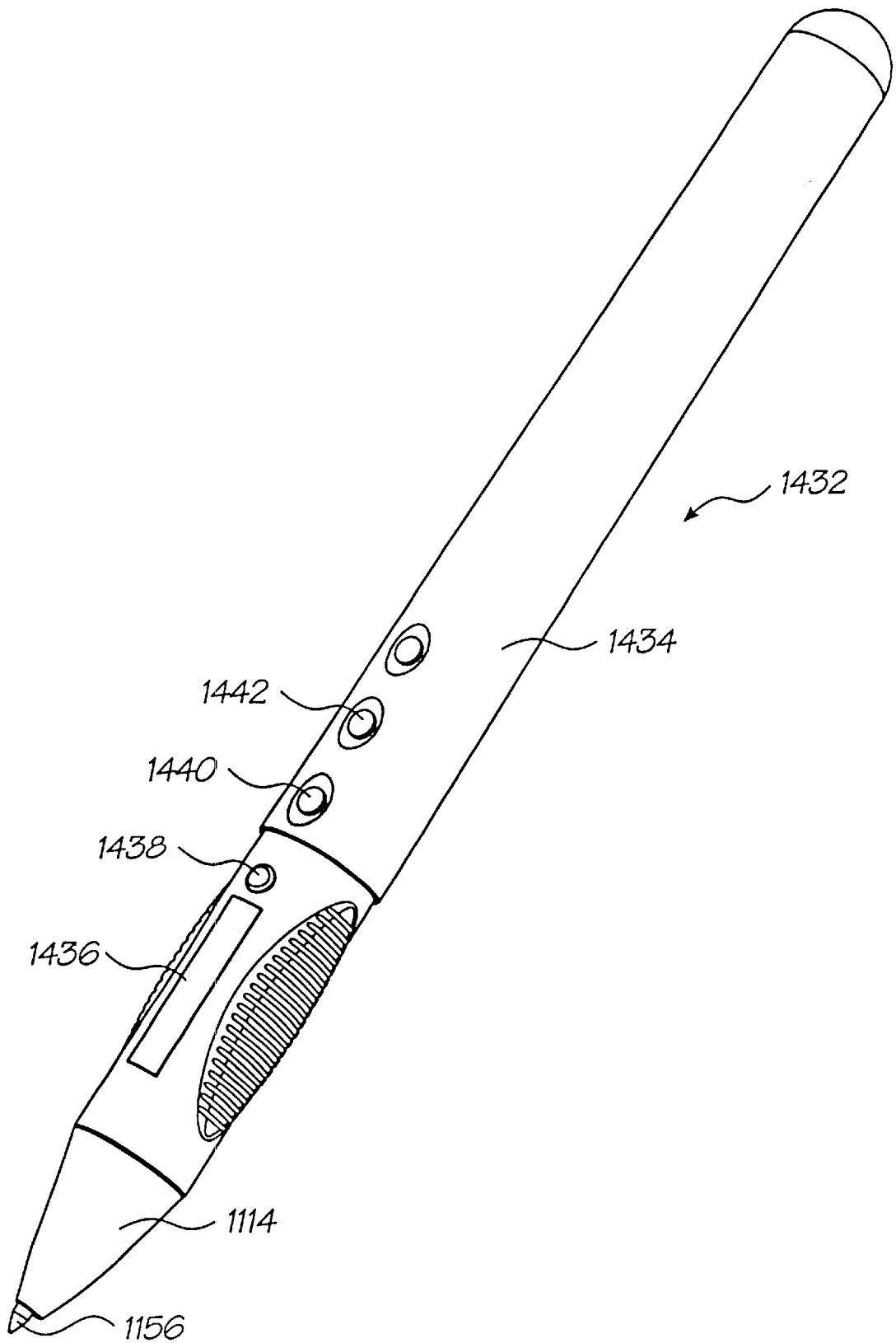
FIG. 25 shows a perspective view of a pen according to a further embodiment of the invention.

FIG. 25 shows a pen 1432 including a pen body 1434 and a replaceable four color ink cartridge 1114. The pen body 1434 includes a color display 1436, preferably an OLED, and three control buttons 1438, 1440 & 1442. The pen body includes non volatile memory in which is stored a plurality of different line types, such as solid line, dotted line, dot—dash line etc. The control button 1438 is operable to place the pen in a "select" mode, whereby the buttons 1440 and 1442 cause the pen to cycle through the available stored line types, with the display 1436 displaying the corresponding line to be printed. The buttons 1428 & 1430 cause the pen to scroll through the types in opposite directions. Once the desired value is displayed, it may be selected via the button 1438 and the pen will then produce the selected line type until it is changed. It will also be appreciated that the line width may be modified in a similar manner, with the pen having a number of line widths stored and which may be selected by the user.

Other control models are within the scope of the invention and the invention is not limited to control of attributes via potentiometers or control buttons.

Figure 26:
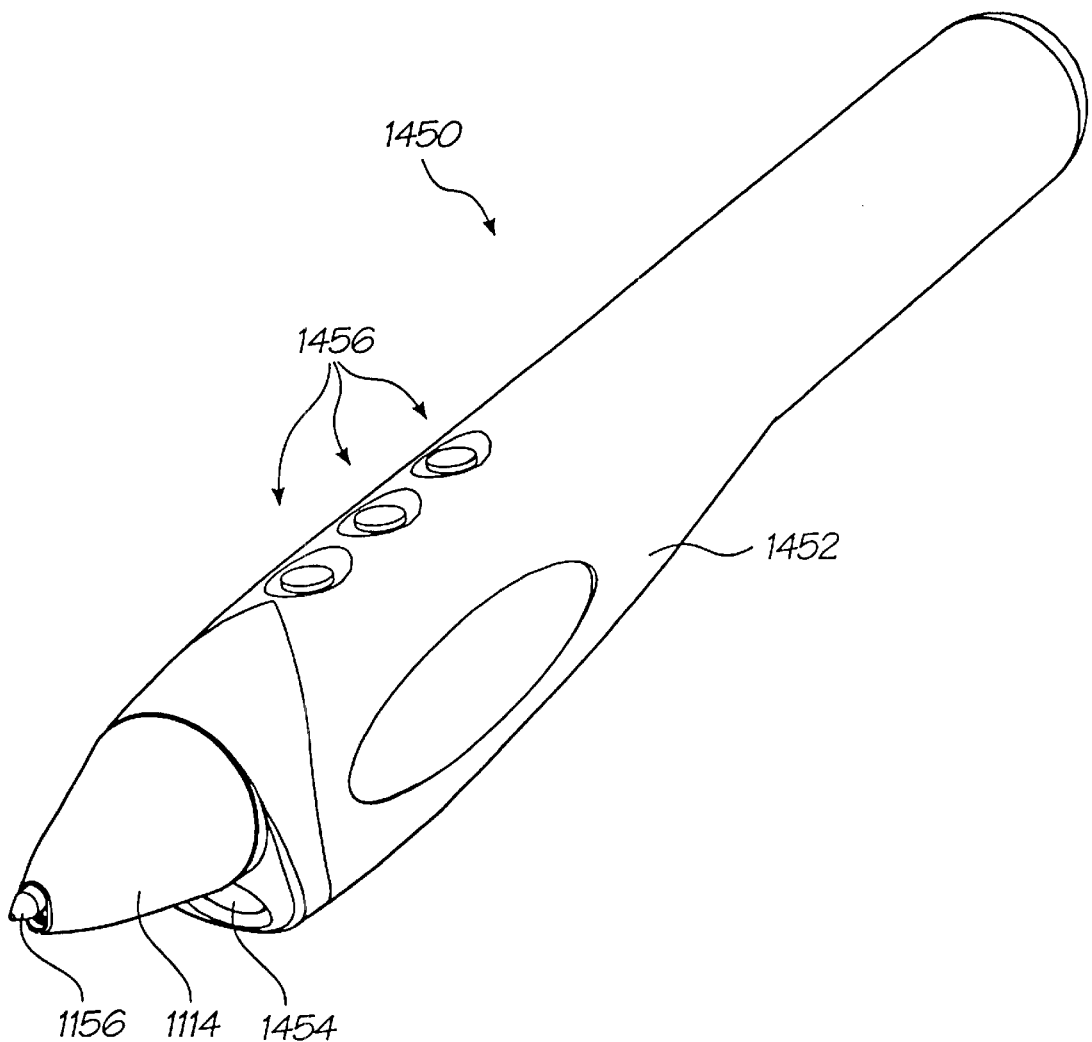
FIG. 26 shows a perspective view of a pen according to a further embodiment of the invention.
Figure 27:
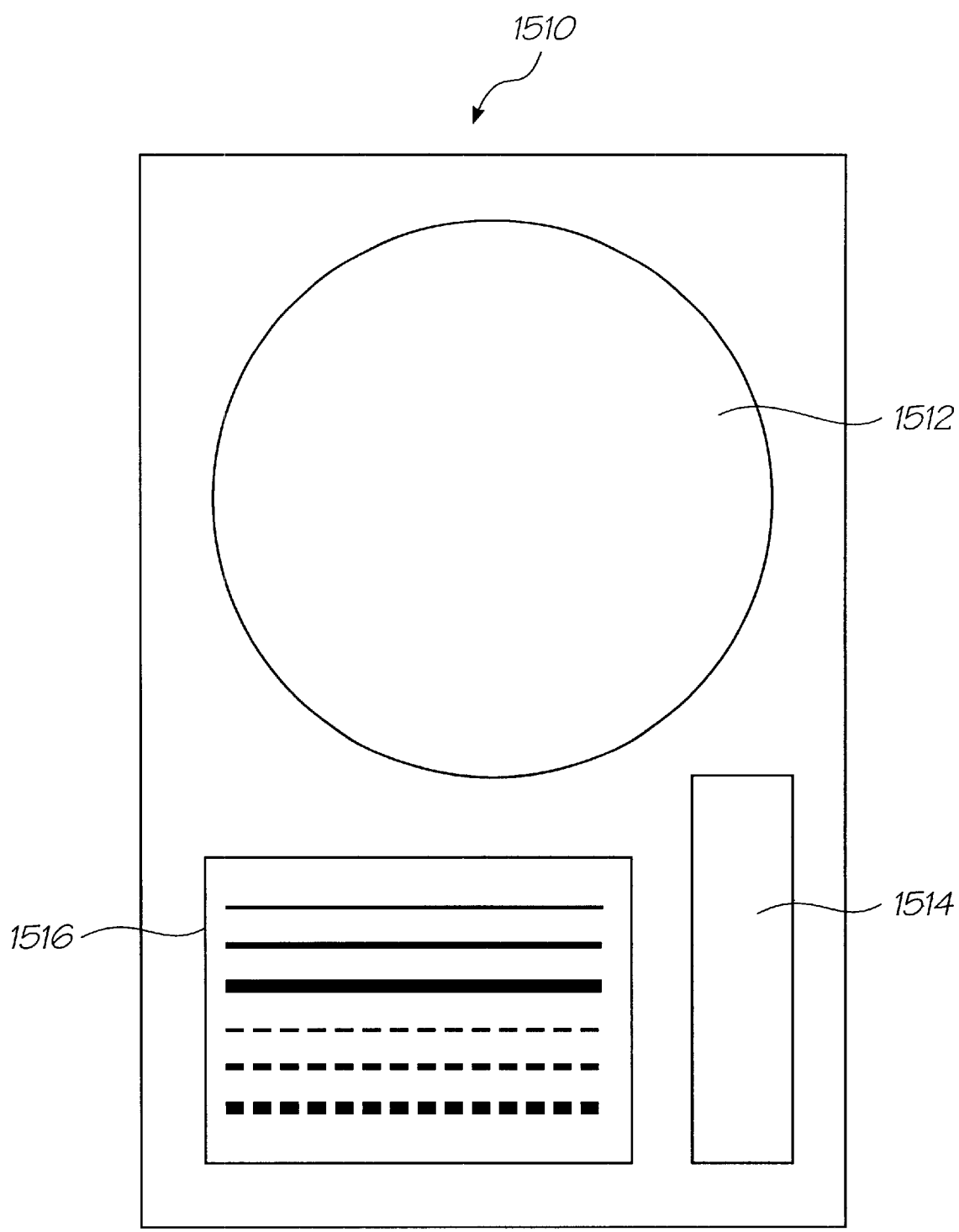
FIG. 27 shows a color card for use with various embodiments of the invention.
Figure 28:
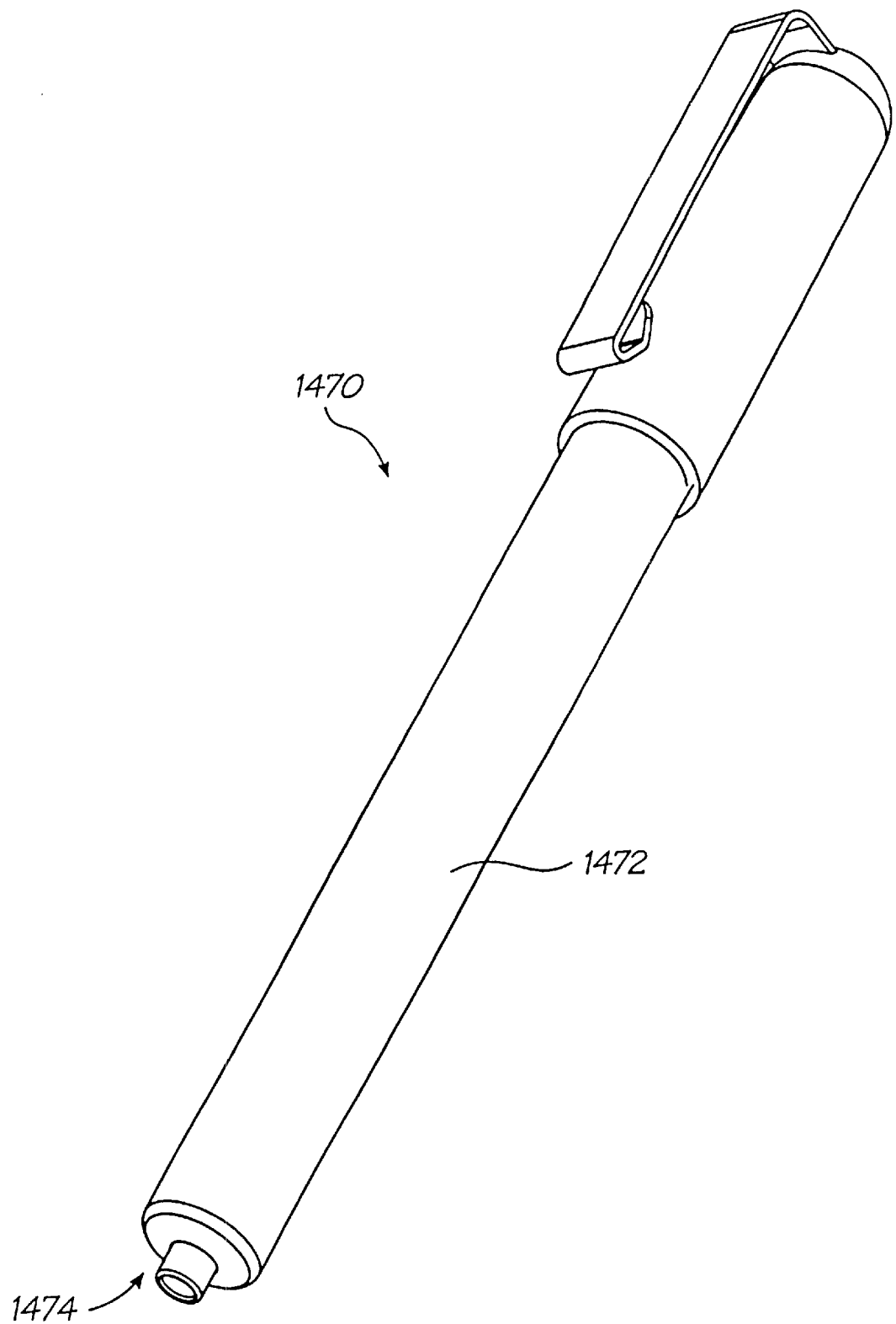
Figure 29:
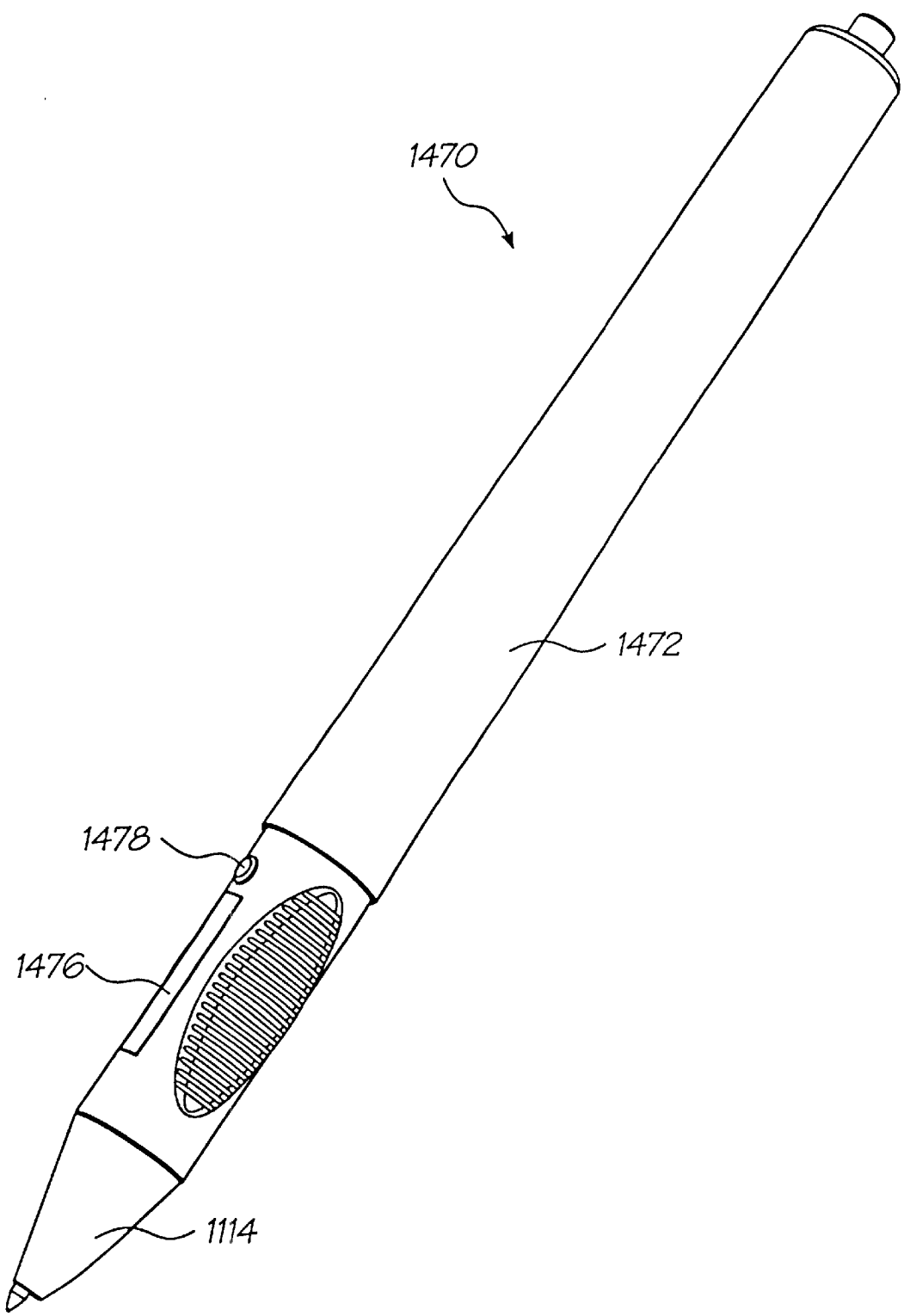
FIG. 29 shows a perspective view of the pen of FIG. 28 with the cap off.
Figure 30:
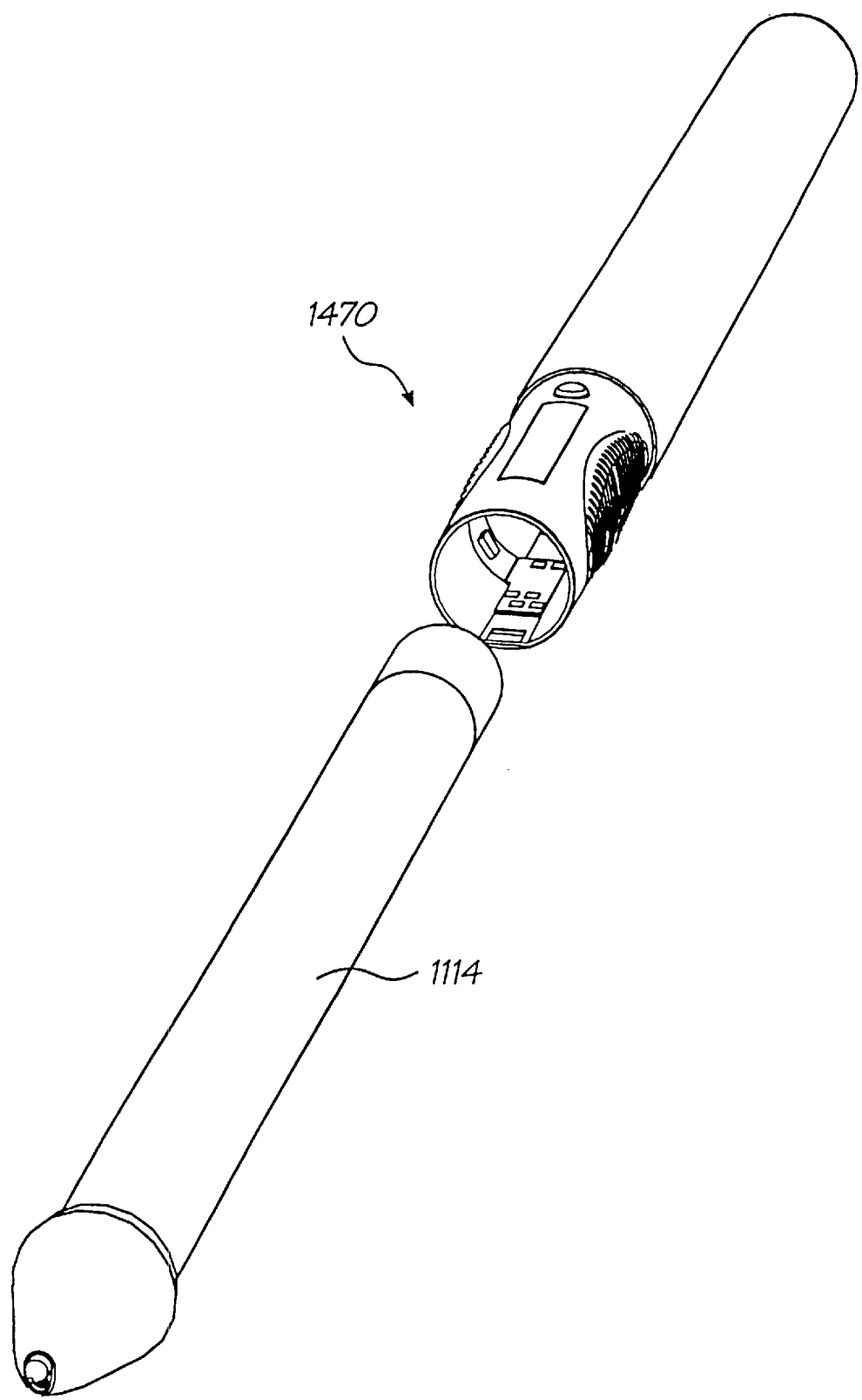
FIG. 30 shows an exploded perspective view of the FIG. 29 pen.
Figure 31:
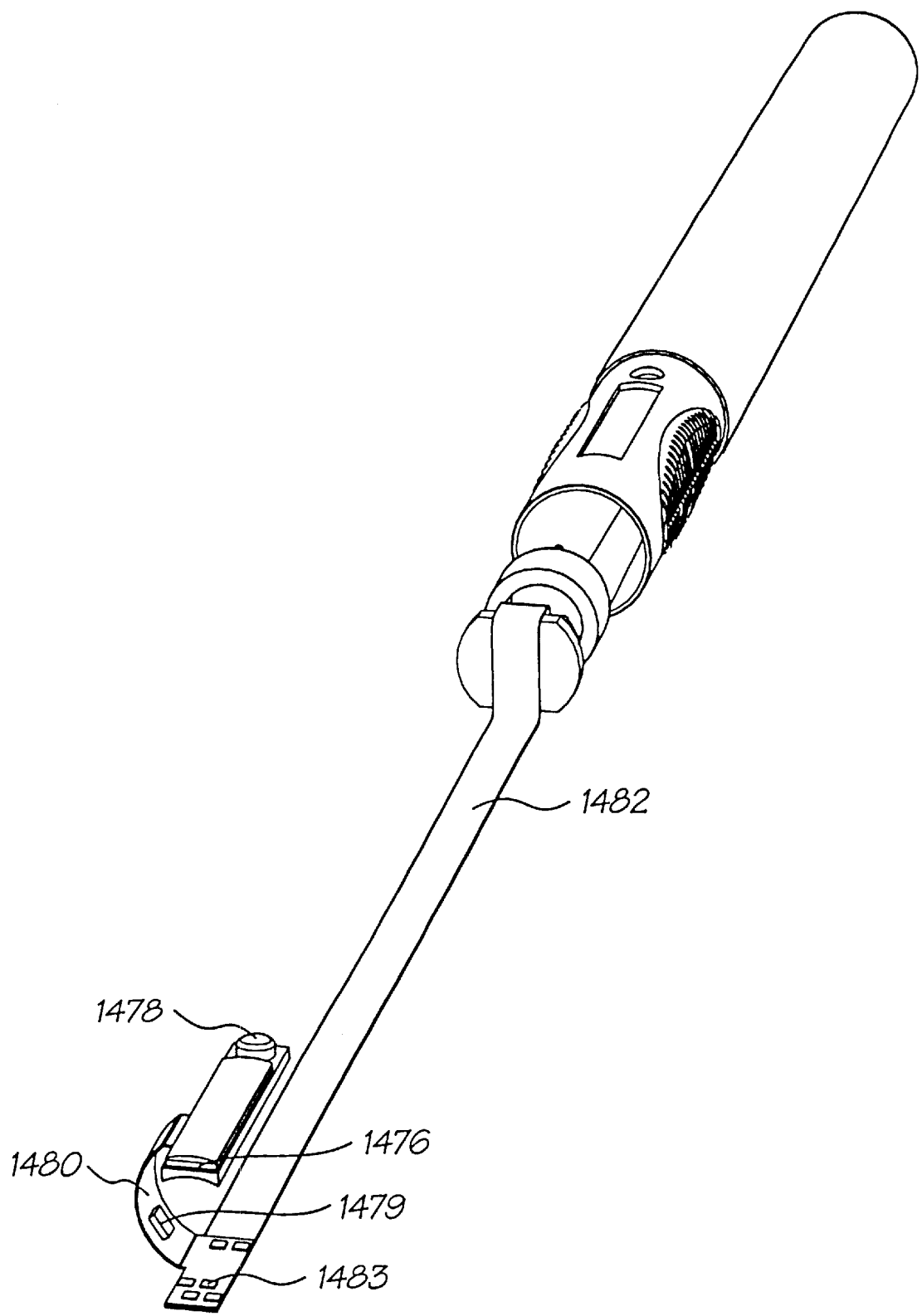
FIG. 31 shows an exploded perspective view of parts of the FIG. 29 pen.
Figure 32:
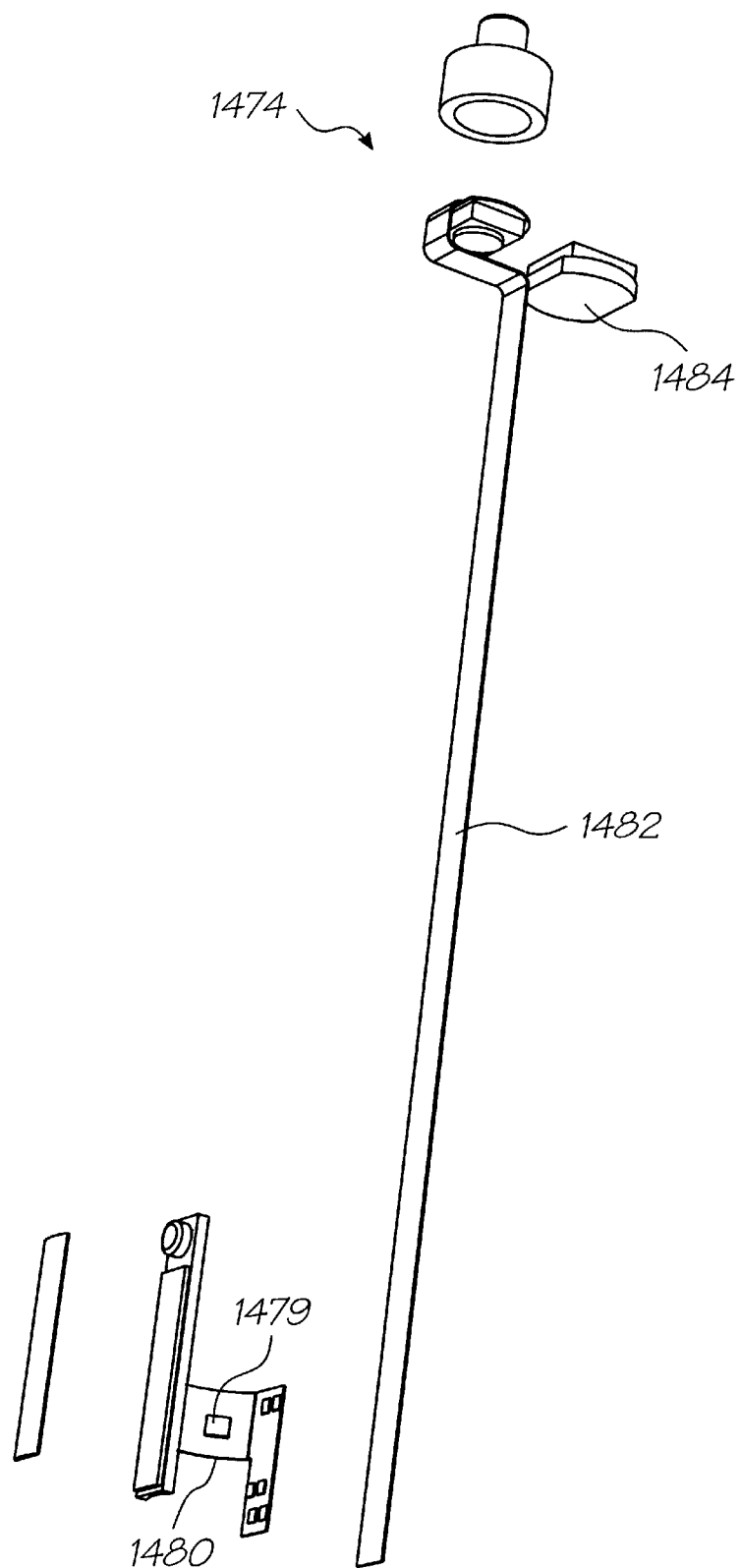
FIG. 32 shows another exploded perspective view of parts of the FIG. 29 pen.
Figure 33:
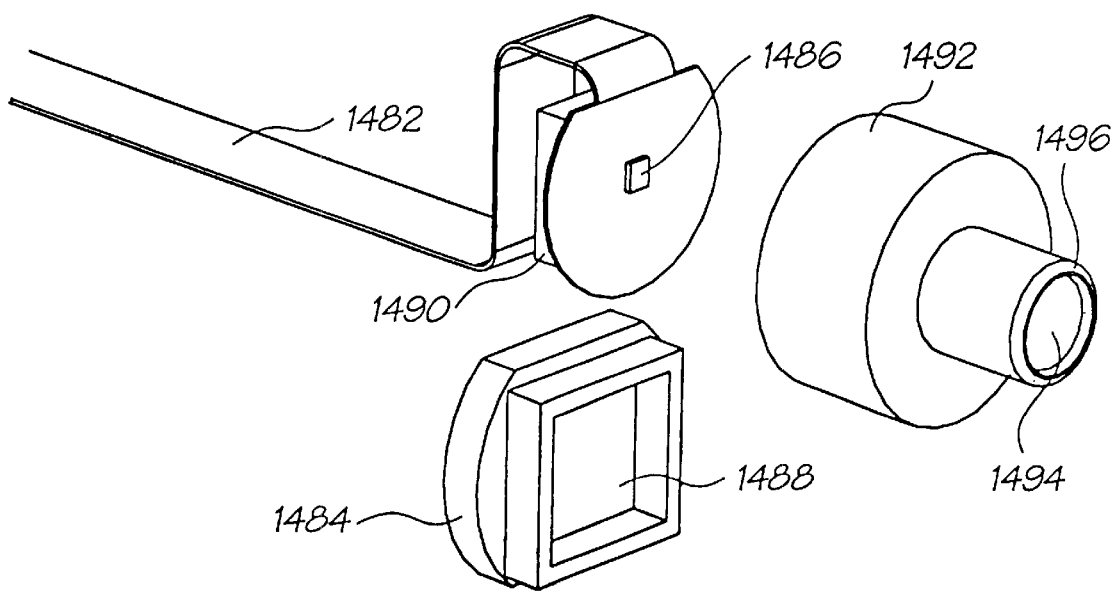
FIG. 33 shows another exploded perspective view of parts of the FIG. 29 pen.

In will be appreciated that a single pen may provide control of color, line type and line width, and other attributes as desired, with a single display and three control buttons, with the selection button causing the pen to cycle through available attributes, such as color, line type and line width. Additionally buttons may be provided for cycling through color components individually, such as hue, saturation and value Color Control Via Sampling Netpage Sensing FIG. 26 shows a pen 1450 having a four color ink cartridge 1114 and a pen body 1452. The pen body incorporates the sensor package 1454 described with reference to FIGS. 9 and 10 and which is capable of imaging a substrate. The pen body includes control buttons 1456 and non volatile memory (not shown). The pen is operable to "pick" a color from any object by "clicking" the stylus nib 1118 against the object either alone or in conjunction with pushing an appropriate one of buttons 1456. A color card 1510, shown in FIG. 27 may be provided with a rainbow of pre defined colors 1512 for use with the pen. The card also includes an area 1514 for setting the brightness of the color and an area 1516 for selecting a line width and/or style.

The sensor package 1454 may be capable of detecting and decoding netpage tags as described in our earlier application U.S. Ser. No. 09/575,129 (docket no. NPT002US) and a "color card" may be provided with a series of color samples, each of which is also invisible encoded with netpage type tags. The tags for each color sample may merely indicate function rather than position, such as "set the color to X" where X is the color of the sample. The pen includes memory in which the function associated with a particular tag code is stored. To set the pen to a particular color the user merely clicks the desired color and the pen senses and decodes the tag.

An alternative structure of the color card (not shown) may include two command areas. The first area includes tags equivalent to a command of "place in color selection mode" or "pick" mode whilst the second area includes tags equivalent to the command of "set the color to the current color", or "set" mode. To select a color the user may merely "click" on the first area, click on the desired color sample and then click on the second "set" area.

In a further variation the color card may include a series of different colors whose values are encoded in a single tag. The card may include an area encoded with these tags so that a user may click the area and upload a series of colors rather than just one.

Alternatively the tags may operate as in the netpage system where the tags are decoded and transmitted to a netpage server. The server determines the function associated with the tags and transmits an appropriate instruction back to the pen. In this regard reference is made to the FIGS. 9 & 10 embodiment which includes appropriate hardware (transmitter and aerial) for transmitting and receiving information to an external device.

Where a pen is connected to a computer system the attributes of what is printed may be set by the user using the computer rather than controls on the pen.

The color card may also include areas which allow the user to set any other attribute of the line printed, such as line type or line width.

The display may be used to display modal, selection, and status information, including:

mode name
current color/texture for drawing/painting
current line width for drawing
current brush for painting
first few words of current text selection
image fragment of current image selection
Universal Resource locator (URI) of hyperlink selection
pen status (power, communication with printer, etc.)
error messages
Sensing with Sensor at Top of Pen FIGS. 28 to 33 shows a pen 1470 including a replaceable four color ink cartridge 1114. The pen body 1472 includes an optical sensor device 1474 at its top end. The pen body includes a color display 1476 and a control button 1478. The display and control button are mounted on a first PCB 1480, together with a controller chip or chips 1479. The chip(s) 1479 include a small amount of non volatile memory capable of storing a small number of color (or other attributes) samples. The PCB includes contact pads 1483 for contacting with the contact pads of the ink cartridge 1114 and for receiving power and controlling the printhead 1120. The sensor device 1474 is mounted on a second PCB 1482 which engages with contacts (not shown) on the first PCB. Two PCBs are provided for ease of manufacturing and a single PCB may be provided on which all components are mounted.

The sensor device 1474 includes a chassis molding 1484. This molding is seated in a recess in the internal end of the pen body and is in a substantially fixed position. There is provided an image sensor capable of sampling any visible color. The sensor 1486 is preferably a RGB photoreceptor. Other point, line or image sensors may be used.

The molding 1484 includes a recess 1488 in which is located a movement switch 1490. This switch is sandwiched between the molding and the PCB 1483 on which the image sensor 1486 is mounted. The switch 1490 is normally open but is closed by a compressive force. A lens molding 1492, which includes a lens 1494, is slidably mounted in the end of the pen and bears against the PCB 1482. The molding 1492 includes a stand-off ring 1496 to prevent the lens 1494 contacting a generally planar substrate. Light enters the lens 1494 and is focused/directed onto the point, line or image sensor 1486. The lens molding 1492 may be pressed into the pen, compressing the switch and causing it to change state from open to closed. On release of the compressive force the switch urges the molding 1492 outwards.

The color of the line produced by the pen may be controlled in a variety of ways. As mentioned, the controller chips 1479 are capable of storing a number of different colors. The color to be printed may be selected from the stored colors by use of the control button 1478. The selected color is displayed on the color display. It is also possible to sample and store custom colors in the memory using the image sensing device 1474. The user may "click" the optical sensor device 1474 against a sample of the desired color. This causes the switch 1490 to close and the color detected by the image sensor 1486 is passed to the controller chip(s) 1479. The controller chip then sets the color to be printed and displayed to the sampled color. The user may change colors by "clicking" on a different color sample or by using the control button 1478 to select one of the stored colors.

Colors sampled with the sensing device may be stored in the memory for later use. After "clicking" on the sample the user may depress the button 1478 to store the sampled color in memory, preferably within a preset time, such as 5 seconds. If the button is not pressed the color is treated as a "temporary" color and is not stored. The memory may only be capable of storing a small number of colors, such as five or ten; storing more colors may be possible but makes selection of the desired color more difficult to the user. Where the memory has reached capacity, the pen may implement one of a number of schemes for deleting a stored color to make space for the new color. Deletion may be of the oldest color stored, the color least recently used, the color least frequently used, etc. Alternatively, the user may be prompted to manually delete a color and to then resample the color to be stored. Other deletion schemes are within the scope of the invention.

Other modes of operation are possible; for instance, the pen may automatically store all sampled colors rather than requiring user input. The pen may provide two or more separate memories (even if there is only one physical memory device). A first memory may be used to store "favorite" colors and the second memory for storing "temporary" colors.

The sensor may be used to sample attributes other than color, such as line width and line style.

LINE STYLE OR COLOR CONTROL BY DRAWING

Figure 34:
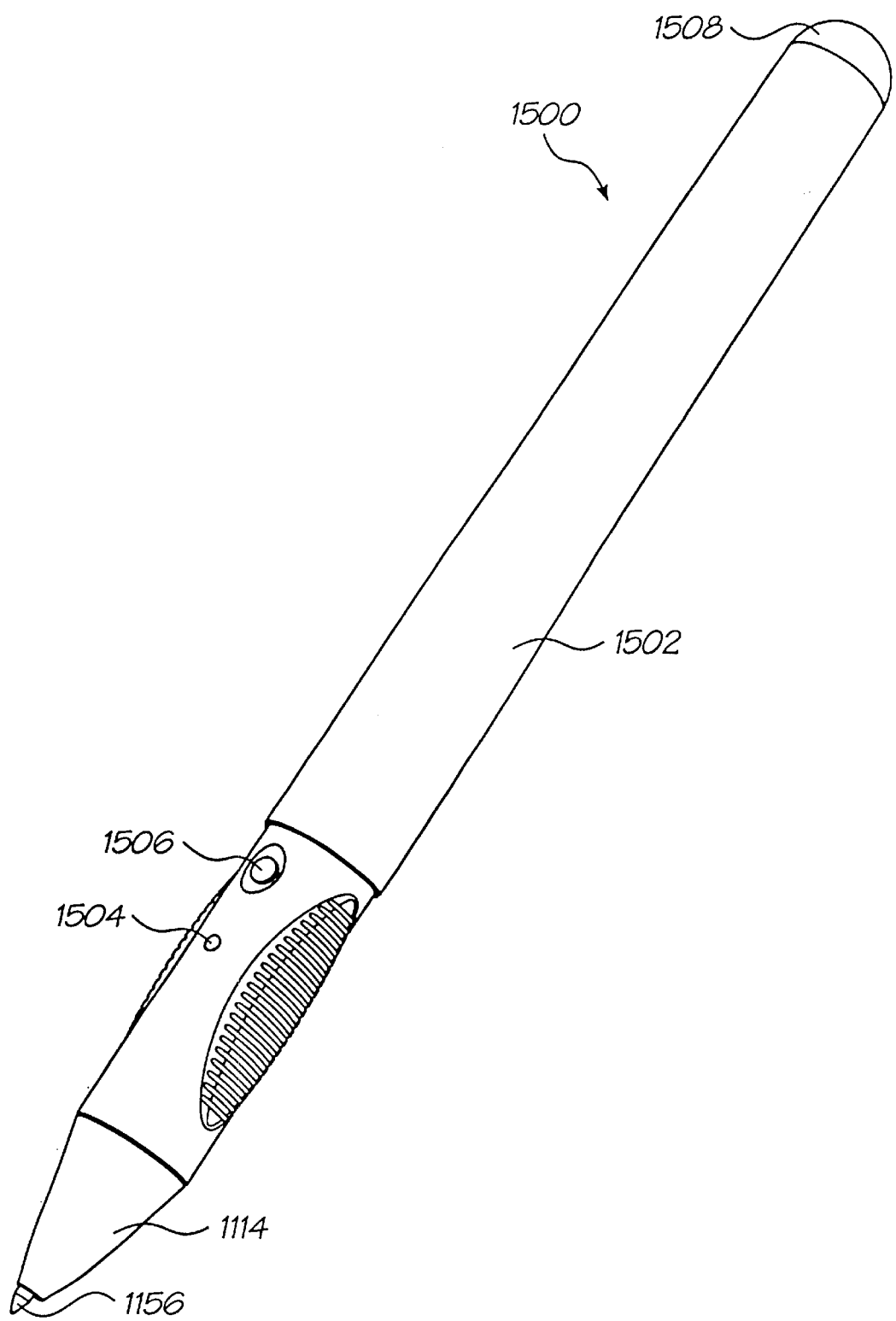
FIG. 34 shows a perspective view of a pen according to a further embodiment of the invention.

FIG. 34 shows a pen 1500 having a pen body 1502 and a replaceable cartridge 1114. The cartridge may be a monochrome or four color cartridge. The pen body includes a control button 1504 and an indicator 1506. The indicator may be a single or multi color LED assembly and may be separate or incorporated into the control button. The pen includes controller circuitry for controlling the printhead 1120 and non volatile memory for storing attributes of the line printed. The pen has two modes; a first mode in which it prints the currently selected set of attributes and a second mode for selecting one of the stored set of attributes. The pen is normally in the first mode and is set in the second mode when a user presses the control button 1504. Preferably the control button 1504 is located on the pen such that in normal use the user is unlikely to accidentally press the button but it is easily accessible. One location is the top 1508 of the pen, although this requires two hands to operate. Near the nib area allows operation with one hand.

When in the second mode the pen preferably indicates this by way of the indicator 1506. The indicator may be inactive in the first mode and flash or change color in the second mode. If desired the indicator may be omitted.

To cycle through the available sets of attributes the user merely draws a line on a piece of paper or the like. As discussed above, the printhead is only activated when the stylus nib is pressed on the paper. Thus cycling through the sets can be triggered by the commencement or ceasing of drawing. In the preferred form the user draws a line and lifts the pen. The attribute set just drawn is set or marked as a path to the "current" attribute set on "lift off" of the stylus nib. If the user presses the button 1504 the pen continues printing with the "current" attribute set, i.e. the line just drawn. If the button is not pressed then on "put down" of the stylus nib the "current" attribute set is changed to the next set of attribute values in the memory which is different from the set of attribute values applied to the preceding path and that new attribute set is printed. By marking paths or diawing lines one after the other the pen is caused to cycle through the different available attribute sets. The attribute sets may be colors, line widths, line styles or any other characteristic which may be changed, or a combination of such characteristics. The pen may have a number of groups of attribute sets, such that a first group allows color selection, a second group allows line style selection and a third group allows line width selection, for example. Selecting the appropriate group to modify may be achieved using the control button 1504. Alternatively one may cycle through all members of all groups sequentially.

INDIRECT PRINTING

Although direct printing of ink onto a substrate is the preferred printing method, indirect printing is possible. A small Memjet printhead can be used to construct a universal drawing implement. A small cylindrical roller is in contact with the page. The roller spins freely about the axis of the stylus, so that as the roller is dragged across the page, it automatically orients itself so that it is at right angles to the direction of motion. The Memjet printhead is mounted behind the roller. It prints onto the back of the roller, and the roller transfers the printed image onto the page. A small cleaning station cleans any ink off the surface of the roller after it has contacted the page, so that the printhead always prints onto a clean surface. The printhead reproduces a contone color image via dithered bi-level CMY or CMYK. The stylus can be programmed to produce any colored, textured continuous line or paint stroke. The rate of printing is dictated by the speed of movement of the roller relative to the page. This can be determined in several ways, e.g. from the actual rotation of the roller, or by continuously imaging the surface and detecting movement in the same way as a second-generation optical mouse, or by sensing and decoding the map of a self-mapping surface.

The stylus can also be switched into non-marking mode, obviating the need for both marking and non-marking nibs.

The user can load virtual colors, textures and line styles into the universal pen from printed palettes. The stylus can optionally indicate its current settings via an LCD or LEDs.

STROKE EFFECTS

The pen of the present invention is capable of many varied stroke effects. Some, such as color and line width are independent of time and position. Others, such as printing a dotted line are dependant on time and/or relative position of the pen. The FIG. 9 & 10 embodiment optionally includes an accelerometer array. This array may used to derive the relative position of the pen as it moves over a substrate. Thus a dot—dash line may be drawn with equal length dashes despite variations in pen speed. Many other effects are also possible, these including:

Stroke style
Color texture (flat, image, procedural)
Opacity texture (flat, image, procedural)
Nib shape (2D shape, 3D shape, orientation)
    Determines stroke width
    Determines "cap" and corner shapes
Varying style with
Time (speed)
    Stroke width
    Opacity (airbrush)
Space (including orientation)
    "Reveal" image
    "Checkered paint"
    Dashed line
    Rainbow colors
    "Image hose"
Location
    On/off
    Specific style/current style
Tilt
    3D nib shape
Force ("pressure")
Stroke width
Opacity (airbrush)
Simulated physics of nib, ink, paper, brush, paint and canvas
    Transfer of ink/paint from nib/brush to paper/canvas
    Striated brush stroke
    Layering (stroke on canvas and stroke on stroke)
    Diffusion
    Viscosity
    Mixing
    Kubelka-Munk color model
    Simulated lighting
    Light source direction and color
    Color physics of media
    Layering topography
Examples
    Pen
    Ball-point
    Calligraphy
    Pencil
    Graphite
    Color
    Charcoal
    Oil paint
    Water color
    Crayon
    Pastel In this regard reference is made to our earlier applications U.S. Ser. No. 09/112,777, U.S. Ser. No. 09/112,797, U.S. Ser. No. 09/113,091 and U.S. Ser. No. 09/113,054.

MOTION SENSING

The embodiment of FIGS. 9 & 10 optionally includes an accelerometer. This accelerometer may be used to provide relative motion sensing/positioning within a pen stroke or a number of strokes. This motion may be recorded and used to provide a digital ink record of the user's strokes. Relative motion sensing may be achieved by other means, such as gyroscopes or use of a rolling ball in contact with the substrate.

Absolute positioning within a stroke is more desirable. The pen of FIGS. 9 & 10 has netpage functionality—it is capable of detecting and decoding invisible tags printed on a substrate. This netpage functionality provides the pen with the ability to fix its position on a netpage encoded substrate absolutely (and thus absolutely within a stroke) using the absolute positioning encoded in the tags. Alternatively, the pen may rely on the grid based layout of the tags to provide absolute positioning within the stroke without decoding the tags. Absolute positioning within the stroke may be achieved using other means, such as imaging the surface of the substrate and using the texture of the substrate to detect movement.

As mentioned above, use of netpage tags enables absolute positioning within a page. This enables the pen to be controlled by a netpage application to mark a netpage surface. The user moves the pen over the page. As the pen moves it detects tags which enable its absolute position on the page to be established. The netpage application controls the pen to mark the page according to its position. As such the pen can be used to "reveal" an image by rubbing the stylus over the relevant portion of the page.

COMPUTER INTERFACE

The pen of FIGS. 9 & 10 is netpage enabled and has two way communication with a netpage server. Using appropriate software it is possible to control the attributes of the marking device from a netpage application. For example, the user may pick a color, a palette of colors, nib styles or line styles and download these into the pen's memory.

The netpage tags may encode a function or location; the pen may have stored in memory functions, so that the pen can be controlled by sensed tags without the need to revert to a netpage server. Location code interpretation usually needs to be carried out by the netpage server.

The netpage system includes a feature referred to as "digital ink" whereby the system records the path of the pen, to enable recordal of signatures. The pen of FIGS. 9 & 10 provides the ability to also record the "style" of the digital ink. The pen may transmit to the netpage server information relation to one or more attributes of the visible markings placed on the substrate. These attributes include but are not limited to color, line width and line style.

Communication of the pen may be by infrared, short range (Digital Enhanced Telephone, Bluetooth) or long range Code Division Multiple Access (CDMA), Global System Mobile (GSM) radio transmission, via a local relay (Bluetooth to mobile phone)or via a temporary or permanent wired connection. A temporary wired connection may be useful for downloading an entire palette.

CONCLUSION

Whilst the invention has been described with reference to ink jet type marking devices, it is to be understood that the invention is not limited to ink jet type devices or devices which deposit material onto a substrate. The invention includes devices which alter the substrate, such as thermal printers and electronic paper type (e ink) printers, which change the state of electronically changeable elements of a substrate. For a better understanding of electronically active inks, reference is made to U.S. Pat. Nos. 6,017,584, 6,124,851, 6,120,839, 6,120,588, 6,118,426 and 6,067,185, all assigned to E Ink Corporation, the contents of which are included herein by reference.

It will be appreciated that whilst the embodiments described each only include some of the features of the invention, some or all of the features disclosed in two or more different embodiments may be combined together.

The present invention has been described with reference to a preferred embodiment and number of specific alternative embodiments. However, it will be appreciated by those skilled in the relevant fields that a number of other embodiments, differing from those specifically described, will also fall within the spirit and scope of the present invention. Accordingly, it will be understood that the invention is not intended to be limited to the specific embodiments described in the present specification, including documents incorporated by cross-reference as appropriate. The scope of the invention is only limited by the attached claims.

What is claimed is:

1. A pen including a marking device and operative to mark a visible path onto a surface, the marking device being electronically controllable to change the value of at least one attribute of the path, the pen including a user interface whereby a user may modify the value of the at least one attribute;
the pen further including:
   a memory for storing different sets of values of the at least one attribute, and
   a selection mode wherein a user may cause the pen to cycle through said stored sets by sequentially marking separate paths, the set of attribute values applied to each path being different from the set of attribute values applied to the preceding path.

2. The pen of claim 1 wherein the user interface includes at least one slider or at least one control button or at least one slider and at least one control button.

3. The pen of claim 1 wherein the user interface includes a display for displaying information relating to the value of the at least one attribute.

4. The pen of claim 1 wherein the memory also stores at least one user defined set of the value of the at least one attribute.

5. The pen of claim 1 wherein the stored sets of values of the at least one attribute can also be cycled by sequentially displaying information on a display.

6. The pen of claim 1 further including at least one sensing device capable of sensing images or colors or both and modifying the value of the at least one attribute based on the sensed images or colors.

7. The pen of claim 6 wherein the memory also stores at least one user defined set of values of the at least one attribute and wherein a user defined set includes values derived from the sensed images or colors.

8. The pen of claim 6 wherein the or at least one of a plurality of sensor devices is capable of sensing images including coded data relating to attributes.

9. The pen of claim 8 further including a decoder to decode the coded data and to change the value of the at least one attribute in response to the sensed decoded data.

10. The pen of claim 1 further including a receiver for receiving commands from an external control source, the value of the at least one attribute being changed in response to said received commands.

11. The pen of claim 1 including a position sensing device or a motion sensing device or both and the value of the at least one attribute is dependant on the relative position of the pen, the relative speed of the pen or both.

12. The pen of claim 1 wherein the value of the at least one attribute includes marking or not marking.

13. The pen of claim 1 further including a non marking stylus nib.

14. The pen of claim 1 wherein the marking device is part of a user replaceable cartridge.

15. The pen of claim 14 further including means for deriving information from the cartridge relating to the value of the at least one attribute.

16. The pen of claim 15 wherein the function of the user interface is at least partially dependent on information derived from the cartridge.

* * * * *